US012362521B2

(12) United States Patent
Shimomaki et al.

(10) Patent No.: US 12,362,521 B2
(45) Date of Patent: Jul. 15, 2025

(54) CONNECTOR ASSEMBLY

(71) Applicant: JAPAN AVIATION ELECTRONICS INDUSTRY, LIMITED, Tokyo (JP)

(72) Inventors: Yuta Shimomaki, Tokyo (JP); Masaki Kimura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 447 days.

(21) Appl. No.: 17/871,633

(22) Filed: Jul. 22, 2022

(65) Prior Publication Data

US 2023/0058140 A1 Feb. 23, 2023

(30) Foreign Application Priority Data

Aug. 20, 2021 (JP) ................................ 2021-134584

(51) Int. Cl.
*H01R 13/64* (2006.01)

(52) U.S. Cl.
CPC .................................... *H01R 13/64* (2013.01)

(58) Field of Classification Search
None
See application file for complete search history.

(56) References Cited

U.S. PATENT DOCUMENTS 9,490,579 B2 11/2016 Little et al.
9,780,490 B2 * 10/2017 Xing ..................... H01R 13/64
9,893,468 B2 2/2018 Zhao
10,224,677 B2 * 3/2019 Han ..................... H01R 12/725
11,251,564 B2 2/2022 Shimomaki et al.

FOREIGN PATENT DOCUMENTS

CN 107437681 B 7/2019
JP 2002298983 A 10/2002
JP 2021086702 A 6/2021

OTHER PUBLICATIONS

Japanese Office Action (and an English translation thereof) dated Jan. 22, 2025, issued in counterpart Japanese Application No. 2021-134584.

* cited by examiner

*Primary Examiner* — Ross N Gushi
(74) *Attorney, Agent, or Firm* — Holtz, Holtz & Volek PC

(57) ABSTRACT

A connector assembly comprises a first connector and a second connector mateable with each other. The first connector comprises a first shell which has a first mateable portion and a first key. The first key is located outward of the first mateable portion. The second connector comprises a second shell which has a second mateable portion and comprises a housing which has a projecting end and a second key. The projecting end faces the first connector when the first connector and the second connector are under a separated state where they are separated from each other. The second key is a groove which extends from the projecting end. When the first connector and the second connector are mated with each other, the second mateable portion is received in the first mateable portion, and the first key is received in the second key.

8 Claims, 21 Drawing Sheets

CONNECTOR ASSEMBLY

CROSS REFERENCE TO RELATED APPLICATIONS

This application is based on and claims priority under 35 U.S.C. § 119 to Japanese Patent Application No. JP 2021-134584 filed Aug. 20, 2021, the content of which is incorporated herein in its entirety by reference.

BACKGROUND OF THE INVENTION

This invention relates to a connector assembly comprising two connectors mateable with each other.

For example, this type of connector assembly is disclosed in U.S. Pat. No. 9,490,579B (Patent Document 1), the content of which is incorporated herein by reference.

Referring to FIG. 41, Patent Document 1 discloses a connector assembly 90 comprising a receptacle (first connector) 92 and a plug (second connector) 96 mateable with each other. The first connector 92 has a metal shield (first shell) 93. The first shell 93 is formed with a slit 94. In addition, the first shell 93 has a projecting identifier 95. The projecting identifier 95 is connected to an inner edge of the slit 94 and is bent to be located inside the first shell 93. The second connector 96 has a shell (second shell) 97. The second shell 97 is formed with a slot 98. When the second connector 96 is mated with the first connector 92, the second shell 97 is received in the first shell 93, and the projecting identifier 95 is received in the slot 98. As can be seen from the structure described above, the proper second connector 96 can be mated with the first connector 92 by providing the projecting identifier 95 and the slot 98 at positions corresponding to each other. In other words, the connector assembly 90 has mating keys which allow only the proper second connector 96 to be mated with the first connector 92.

Each of the first connector and the second connector is required to be formed with a slit in order to be provided with the mating keys such as those of Patent Document 1. These slits are unpreferable in a viewpoint of prevention of electromagnetic interference (EMI). The mating keys of Patent Document 1 are particularly unsuitable for a connector assembly which transmits high-speed signals.

SUMMARY OF THE INVENTION

It is therefore an object of the present invention to provide a connector assembly which comprises mating keys and is configured to prevent EMI.

An aspect of the present invention provides a connector assembly comprising a first connector and a second connector. The first connector and the second connector are mateable with each other along a mating direction. The first connector comprises a first holding member, two or more first terminals and a first shell. The first terminals are held by the first holding member. Each of the first terminals has a first contact portion. The first shell has a first mateable portion and a first key. The first mateable portion encloses, at least in part, the first contact portions in a perpendicular plane perpendicular to the mating direction. The first key is a projection provided on the first mateable portion and is located outward of the first mateable portion in the perpendicular plane. The second connector comprises a second holding member, two or more second terminals, a second shell and a housing. The second terminals are held by the second holding member. Each of the second terminals has a second contact portion. The second shell has a second mateable portion. The second mateable portion encloses all around the second contact portions in the perpendicular plane. The housing has a projecting portion, a projecting end and a second key. The projecting portion is apart from the second mateable portion in the perpendicular plane and encloses, at least in part, the second mateable portion in the perpendicular plane. The projecting end faces the first connector in the mating direction when the first connector and the second connector are under a separated state where they are separated from each other in the mating direction. The second key is a groove formed in the housing and extends from the projecting end along the mating direction. The first contact portions are brought into contact with the second contact portions, respectively, under a mated state where the first connector and the second connector are mated with each other. Under the mated state, the second mateable portion is received in the first mateable portion, and the first key is received in the second key.

According to an aspect of the present invention, the first key of the first connector is received in the second key of the second connector under the mated state. As can be seen from this mechanism, the first connector can be mated with the proper second connector by providing the first key and the second key at positions corresponding to each other in the perpendicular plane. In other words, the connector assembly of an aspect of the present invention has mating keys which allow only the proper second connector to be mated with the first connector. The mating keys of an aspect of the present invention include the first key of the first connector and the second key of the second connector.

The second key of an aspect of the present invention is not formed in the second mateable portion of the second shell but is formed in the housing which is apart from the second mateable portion. Therefore, the second mateable portion can be formed in a shape which has no slit and thereby can enclose all around the second contact portions. In addition, the first key is located outward of the first mateable portion of the first shell in the perpendicular plane. Therefore, the second mateable portion can be received in the first mateable portion under the mated state. The thus-received second mateable portion can enclose all around the first contact portions in addition to the second contact portions in the perpendicular plane. In other words, the second mateable portion can electromagnetically shield all around the first contact portions and the second contact portions in the perpendicular plane under the mated state. Thus, an aspect of the present invention provides a connector assembly which comprises the mating keys and is configured to prevent EMI.

An appreciation of the objectives of the present invention and a more complete understanding of its structure may be had by studying the following description of the preferred embodiment and by referring to the accompanying drawings.

Figure 1:
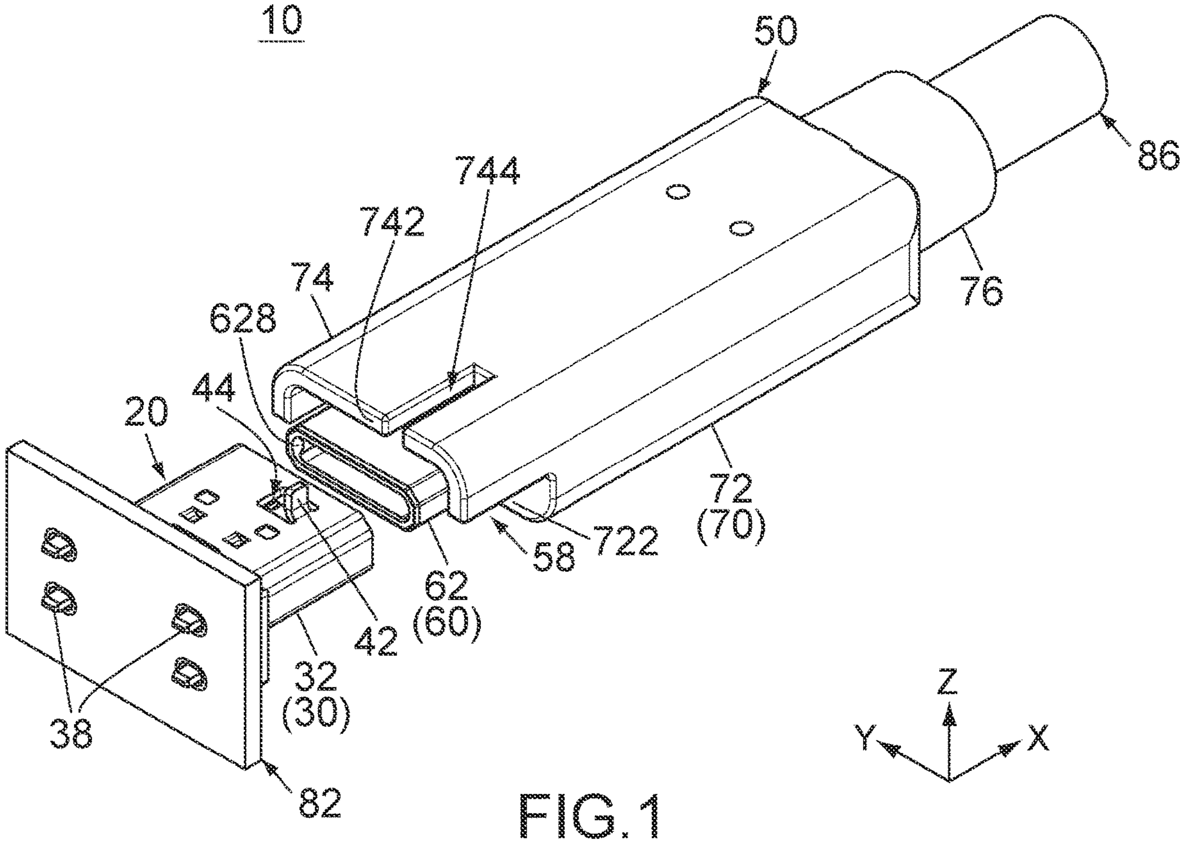
FIG. 1 is a perspective view showing a connector assembly according to an embodiment of the present invention, wherein a first connector and a second connector of the connector assembly are under a separated state where they are separated from each other, the first connector is mounted on a board, and the second connector is connected to a cable.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 2:
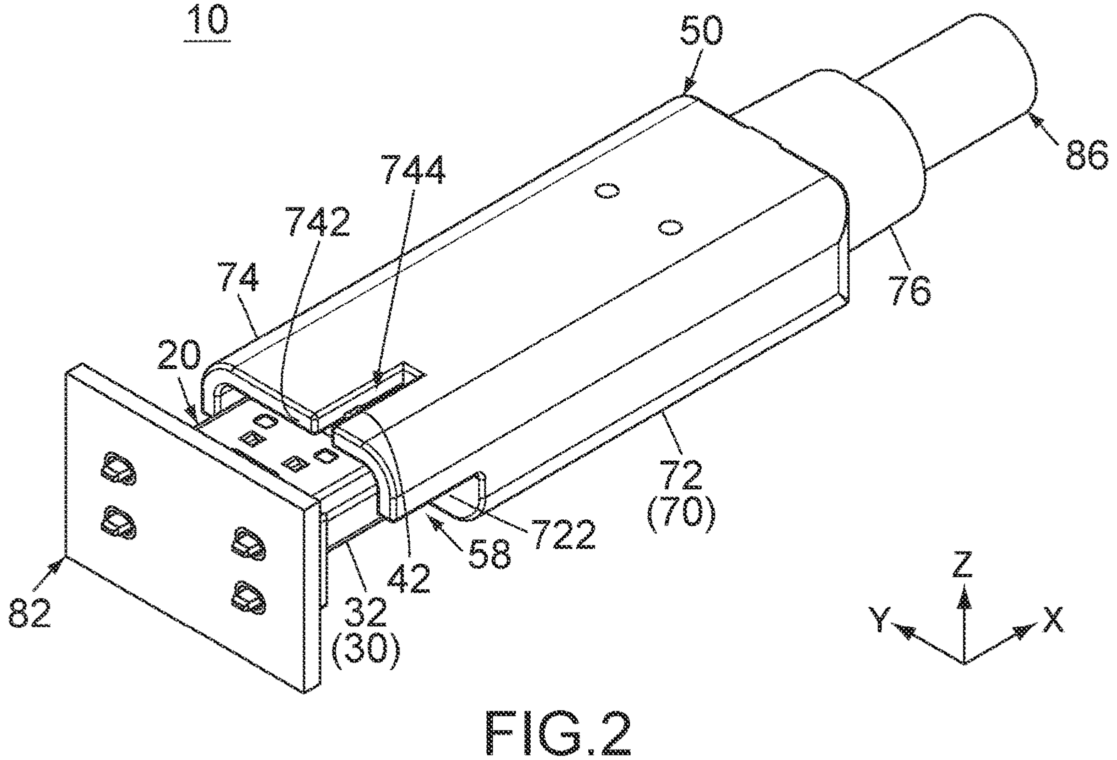
FIG. 2 is a perspective view showing the connector assembly of FIG. 1, wherein the first connector and the second connector are under a mated state where they are mated with each other.

As shown in FIGS. 1 and 2, a connector assembly 10 of an embodiment of the present invention comprises a first connector 20 and a second connector 50. The first connector 20 is a receptacle and is mounted on a circuit board (board) 82 when used. The second connector 50 is a plug and is connected to a cable 86 when used. Thus, the first connector 20 of the present embodiment is an on-board receptacle. The second connector 50 of the present embodiment is a cable plug. In particular, the first connector 20 is a so-called straight receptacle. However, the present is not limited thereto but is applicable to various connector assemblies. For example, the first connector 20 may be a cable connector. The second connector 50 may be an on-board connector.

The first connector 20 and the second connector 50 are mateable with each other along a mating direction. The mating direction of the present embodiment is a front-rear direction and the X-direction. "Forward" means the positive X-direction. "Rearward" means the negative X-direction. However, the present invention is not limited thereto. For example, the mating direction may be an upper-lower direction.

The first connector 20 and the second connector 50 illustrated in FIG. 1 are under a separated state where they are separated from each other in the X-direction. The second connector 50 faces the first connector 20 in the X-direction under the separated state. The second connector 50 of the present embodiment is located forward of the first connector 20 under the separated state. When the second connector 50 is moved toward the first connector 20 along the X-direction under the separated state, the first connector 20 and the second connector 50 take a mated state shown in FIG. 2 where they are mated with each other. Under the mated state, the first connector 20 and the second connector 50 are electrically connected with each other, and thereby an electronic device (not-shown) including the board 82 and another electronic device (not-shown) connected to the cable 86 are electrically connected with each other.

Hereafter, explanation will be made about the second connector 50 of the present embodiment.

Figure 5:
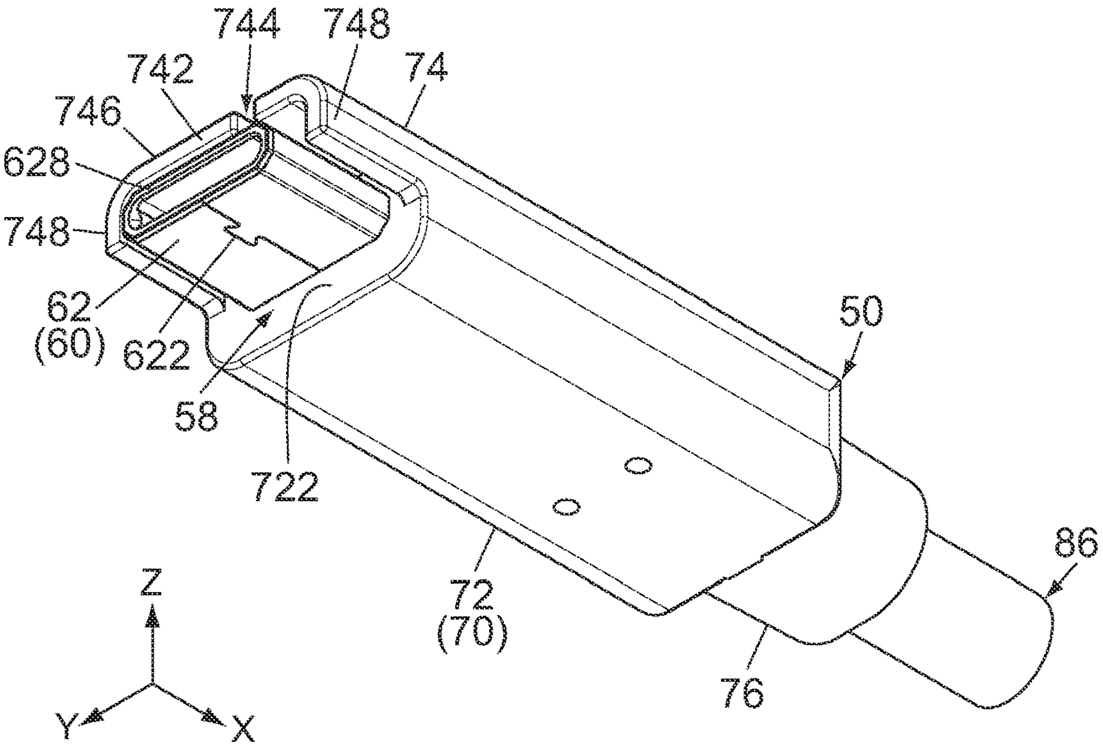
FIG. 5 is a perspective view showing the second connector of the connector assembly of FIG. 1.
Figure 6:
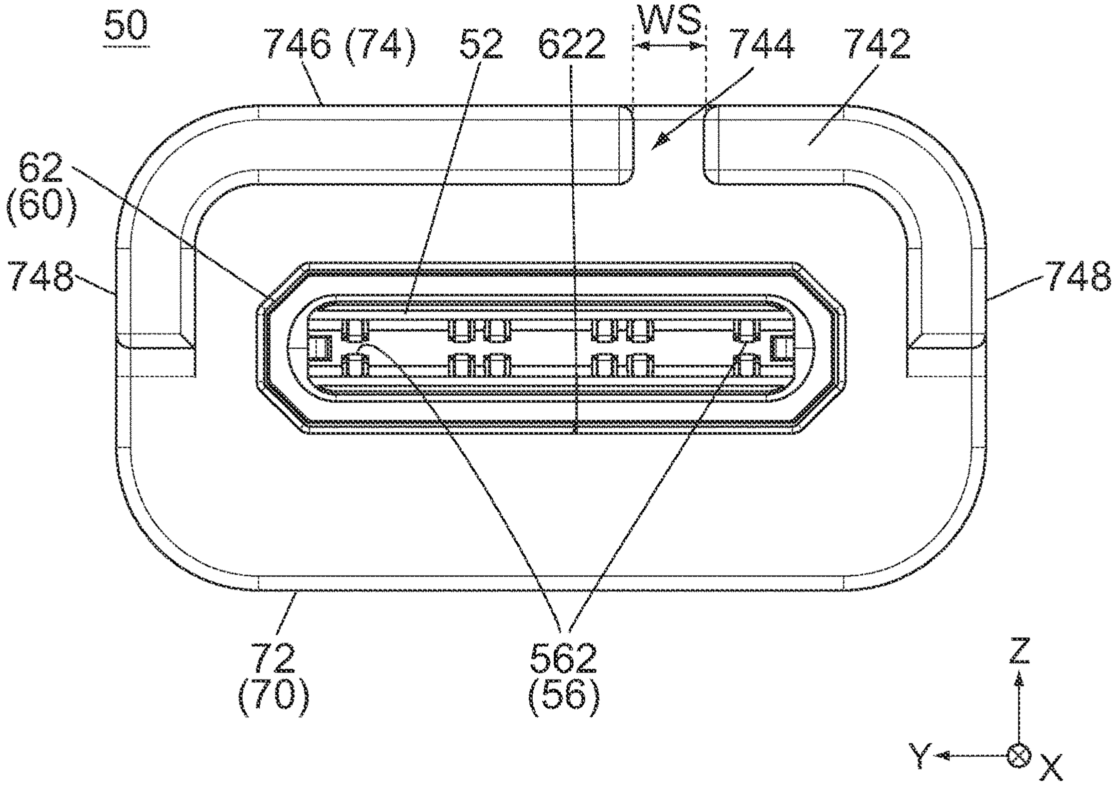
FIG. 6 is a front view showing the second connector of FIG. 5.

Referring to FIG. 6 together with FIG. 5, the second connector 50 of the present embodiment comprises a second holding member 52 made of insulator, two or more second terminals 56 each made of conductor, a second shell 60 made of conductor, a housing 70 made of insulator and a protection member 76 made of insulator.

Referring to FIG. 5, the protection member 76 is molded so as to protect the cable 86. The housing 70 is joined to the protection member 76 when the protection member 76 is molded, and thereby the second connector 50 is attached to the cable 86. However, the present invention is not limited thereto. For example, the protection member 76 may be provided as necessary. Referring to FIG. 6 together with FIG. 5, the second connector 50 may comprise only the second holding member 52, the second terminals 56, the second shell 60 and the housing 70. Instead, the second connector 50 may further comprise another member in addition to the aforementioned members.

Referring to FIG. 6 together with FIG. 2, each of the second terminals 56 of the present embodiment has a second contact portion 562 and a second fixed portion (not shown). The second contact portions 562 are electrically connected with the first connector 20 under the mated state. Each of the second fixed portions of the present embodiment is fixed and connected to a conductive wire (not shown) of the cable 86 via soldering, etc. when the second connector 50 is attached to the cable 86. Each of the second terminals 56 of the present embodiment has the aforementioned structure. However, the structure of each of the second terminals 56 is not specifically limited, provided that each of the second terminals 56 has the second contact portion 562.

The second terminals 56 are held by the second holding member 52. The second contact portions 562 of the present embodiment are divided into two rows in a perpendicular direction perpendicular to the mating direction (X-direction). The second contact portions 562 of each row are held by the second holding member 52 and are arranged in a lateral direction perpendicular to both the X-direction and the perpendicular direction. The perpendicular direction of the present embodiment is an upper-lower direction and the Z-direction. "Upward" means the positive Z-direction. "Downward" means the negative Z-direction. The lateral direction of the present embodiment is the Y-direction. However, the present invention is not limited thereto. For, example, the perpendicular direction may be a front-rear direction. Moreover, all the second contact portions 562 may be arranged in a single row in the Y-direction.

Referring to FIG. 5, the second shell 60 of the present embodiment is made of metal. In detail, the second shell 60 is a single metal plate with bends. However, the present invention is not limited thereto. For example, the second shell 60 may be formed of two or more members joined to each other.

The second shell 60 is fixed to the housing 70. The second shell 60 has a second mateable portion 62. In addition, the second shell 60 has fixed portions which are fixed to the housing 70. The second mateable portion 62 extends along the X-direction so as to be away from the fixed portions of the second shell 60 and has an end 628 in the X-direction. The end 628 is farthest from the fixed portions of the second shell 60 in the X-direction in comparison with the other parts of the second mateable portion 62.

Referring to FIG. 6, the second mateable portion 62 encloses the second holding member 52 in a perpendicular plane (YZ-plane) perpendicular to the X-direction. The second mateable portion 62 of the present embodiment is formed by bending a single metal piece with no hole about an axis in parallel to the X-direction and then joining opposite edges of the thus-bent metal piece together. The opposite edges of the metal piece are joined at a joint 622.

The second mateable portion 62 which is formed as describe above encloses the second holding member 52 substantially with no gap in the YZ-plane. In the YZ-plane, the second mateable portion 62 encloses all around the second contact portions 562 which are arranged on the second holding member 52. The second mateable portion 62 of the present embodiment entirely covers and electromagnetically shields the second contact portions 562 in the YZ-plane. The second mateable portion 62 of the present embodiment is formed with no hole and no slit. However, the present invention is not limited thereto. For example, referring to FIG. 5, the vicinity of the end 628 of the second mateable portion 62 may be formed with a hole or a slit which does not degrade prevention of electromagnetic interference (EMI).

Referring to FIG. 1 together with FIG. 5, the housing 70 of the present embodiment has a base portion 72 and a projecting portion 74. The base portion 72 entirely encloses the second shell 60 in the YZ-plane except for the second mateable portion 62. Each of the projecting portion 74 and the second mateable portion 62 extends from the base portion 72 toward the first connector 20 along the X-direction when the first connector 20 and the second connector 50 are under the separated state.

Referring to FIG. 5, the projecting portion 74 of the present embodiment has a main portion 746 and two side portions 748. The main portion 746 extends along a horizontal plane (XY-plane) perpendicular to the Z-direction. The two side portions 748 are connected to opposite sides of the main portion 746 in the Y-direction, respectively. The two side portions 748 extend along the Z-direction in parallel to each other from the main portion 746 toward the second mateable portion 62. The projecting portion 74 of the present embodiment has the aforementioned structure. According to this structure, the projecting portion 74 is hardly bent even when receives a force. However, the present invention is not limited thereto. For example, the projecting portion 74 may have only the main portion 746.

The projecting portion 74 is apart from the second mateable portion 62 in the YZ-plane and encloses, at least in part, the second mateable portion 62 in the YZ-plane. In detail, the main portion 746 is apart from the second mateable portion 62 in the Z-direction. Each of the side portions 748 is apart from the second mateable portion 62 in the Y-direction. In the YZ-plane, the projecting portion 74 partially encloses one of opposite sides of the second mateable portion 62 in the Z-direction. The vicinity of the end 628 of the second mateable portion 62 is exposed from the projecting portion 74. Moreover, the projecting portion 74 does not enclose a remaining one of the opposite sides of the second mateable portion 62 in the Z-direction. More specifically, the projecting portion 74 of the present embodiment partially encloses an upper part of the second mateable portion 62 in the YZ-plane but does not enclose a lower part of the second mateable portion 62.

As described above, the housing 70 of the present embodiment is apart from the second mateable portion 62 in the YZ-plane and partially encloses the second mateable portion 62 in the YZ-plane. The thus-arranged housing 70 is formed with a receiving portion 58. The receiving portion 58 is a space which is located opposite to the projecting portion 74 in the Z-direction. The second mateable portion 62 is partially located in the receiving portion 58. However, the present invention is not limited thereto. For example, the projecting portion 74 may enclose the whole of the upper part of the second mateable portion 62 including the end 628 in the YZ-plane. In other words, the second mateable portion 62 may be entirely located in the receiving portion 58. Thus, the housing 70 should be apart from the second mateable portion 62 in the YZ-plane and should enclose, at least in part, the second mateable portion 62 in the YZ-plane.

Figure 3:
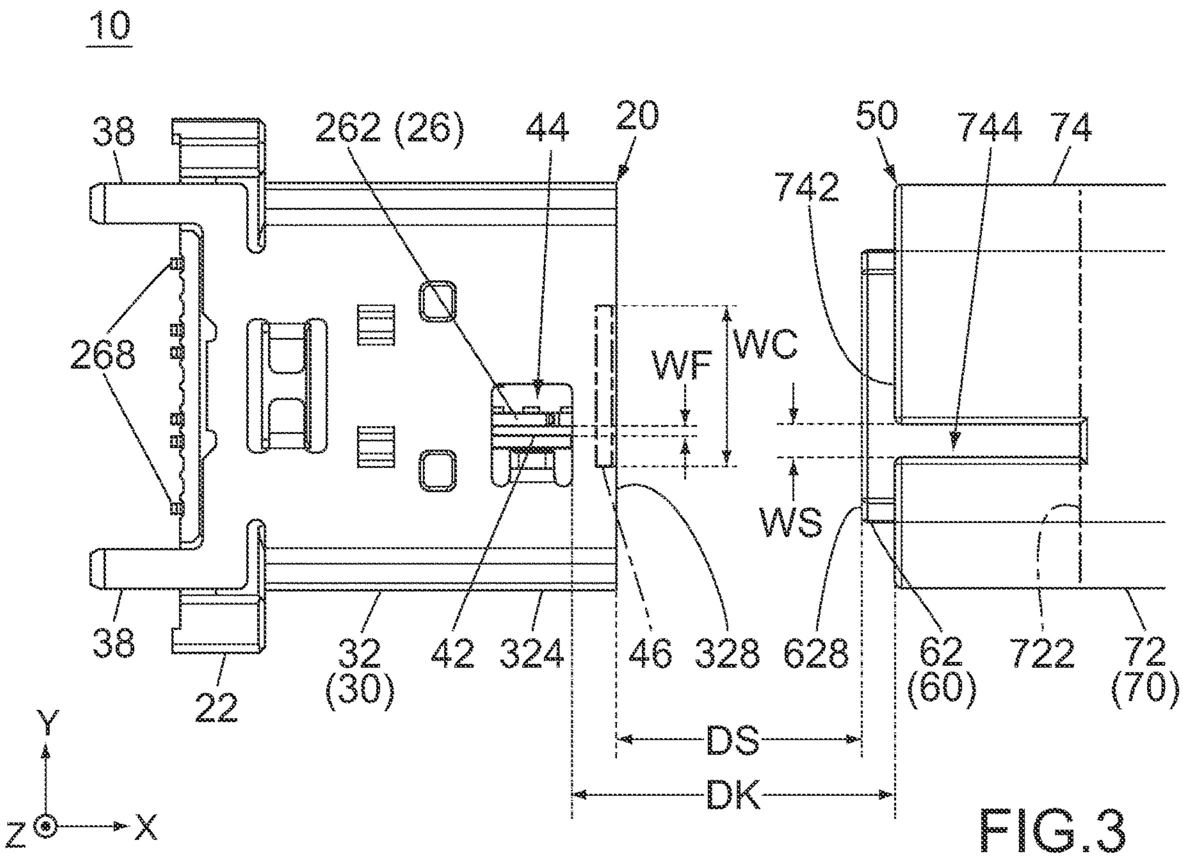
FIG. 3 is a top view showing the connector assembly of FIG. 1, wherein the second connector is partially illustrated, and a position of a stopper of the first connector and a position of a hidden far end of the second connector are illustrated with chain dotted lines.

Referring to FIGS. 1, 3 and 5, the housing 70 of the present embodiment has a far end 722, a projecting end 742 and a second key 744.

Figure 4:
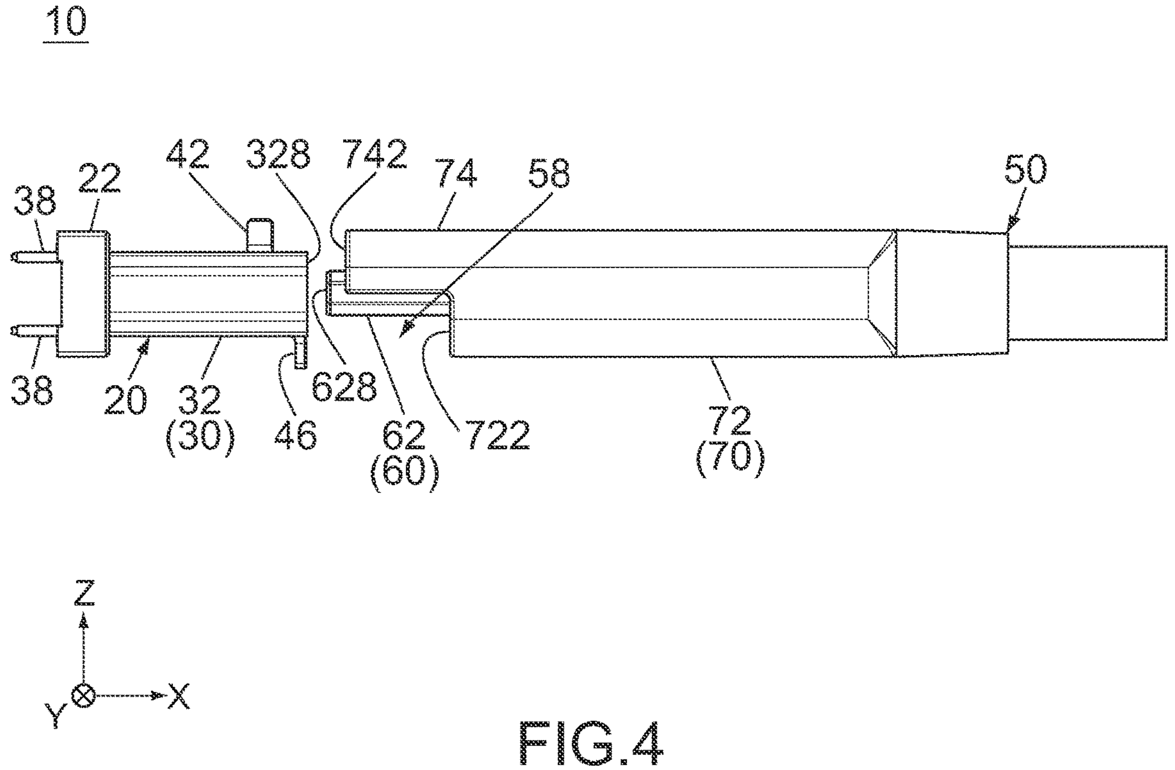
FIG. 4 is a side view showing the connector assembly of FIG. 1.

Referring to FIGS. 3 and 4, the far end 722 faces the first connector 20 in the X-direction when the first connector 20 and the second connector 50 are under the separated state. The far end 722 of the present embodiment is a part of an end surface of the base portion 72 and a planar surface in parallel to the YZ-plane. The far end 722 is located in the receiving portion 58. The second mateable portion 62 is located between the far end 722 and the projecting portion 74 in the Z-direction. However, the present invention is not limited thereto. For example, the structure and the arrangement of the far end 722 can be modified as necessary.

The projecting end 742 faces the first connector 20 in the X-direction when the first connector 20 and the second connector 50 are under the separated state. The projecting end 742 of the present embodiment is a part of an end surface of the projecting portion 74 and a planar surface in parallel to the YZ-plane. However, the present invention is not limited thereto. For example, the structure and the arrangement of the projecting end 742 can be modified as necessary.

Referring to FIGS. 1 and 3, the second key 744 is a groove formed in the housing 70 and extends from the projecting end 742 along the X-direction. The second key 744 opens toward the first connector 20 when the first connector 20 and the second connector 50 are under the separated state. The second key 744 of the present embodiment is a groove formed in the projecting portion 74. The second key 744 passes through the projecting portion 74 in the Z-direction. The second key 744 extends straight along the X-direction from the projecting end 742 to a boundary between the base portion 72 and the projecting portion 74. However, the present invention is not limited thereto. For example, the structure and the arrangement of the second key 744 can be modified as necessary.

Hereafter, explanation will be made about the first connector 20 of the present embodiment.

Figure 7:
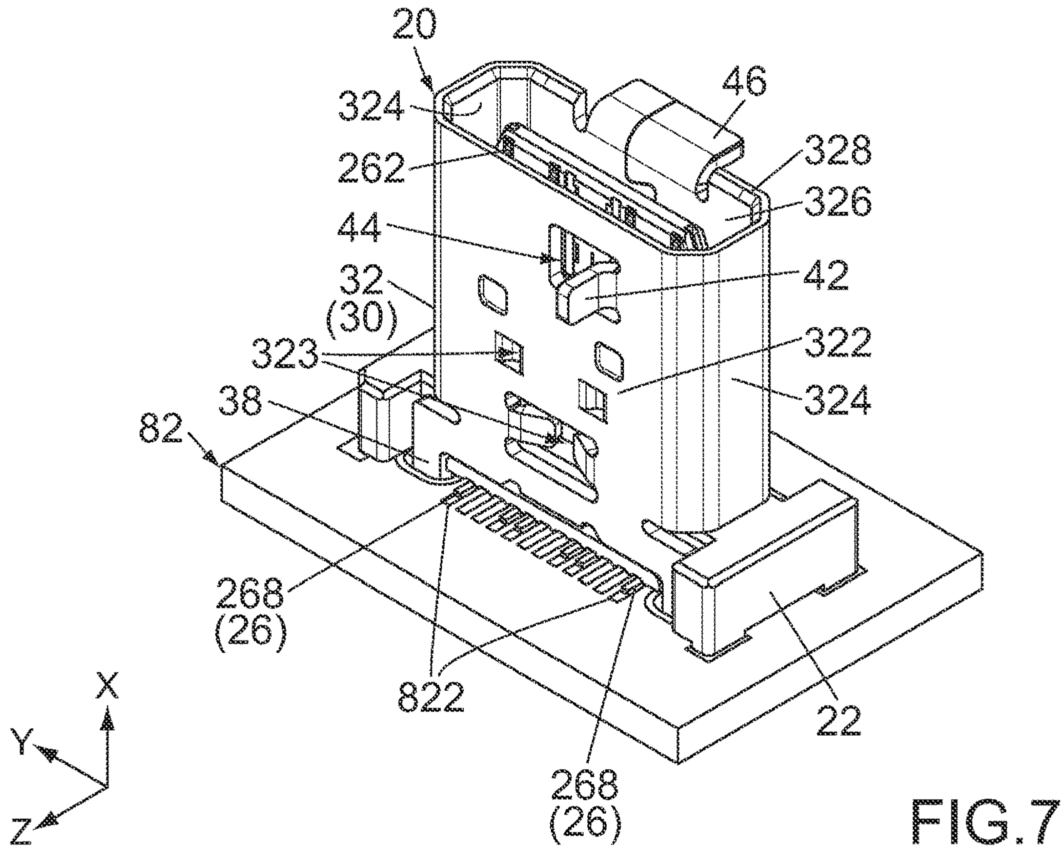
FIG. 7 is a perspective view showing the first connector of the connector assembly of FIG. 1.
Figure 8:
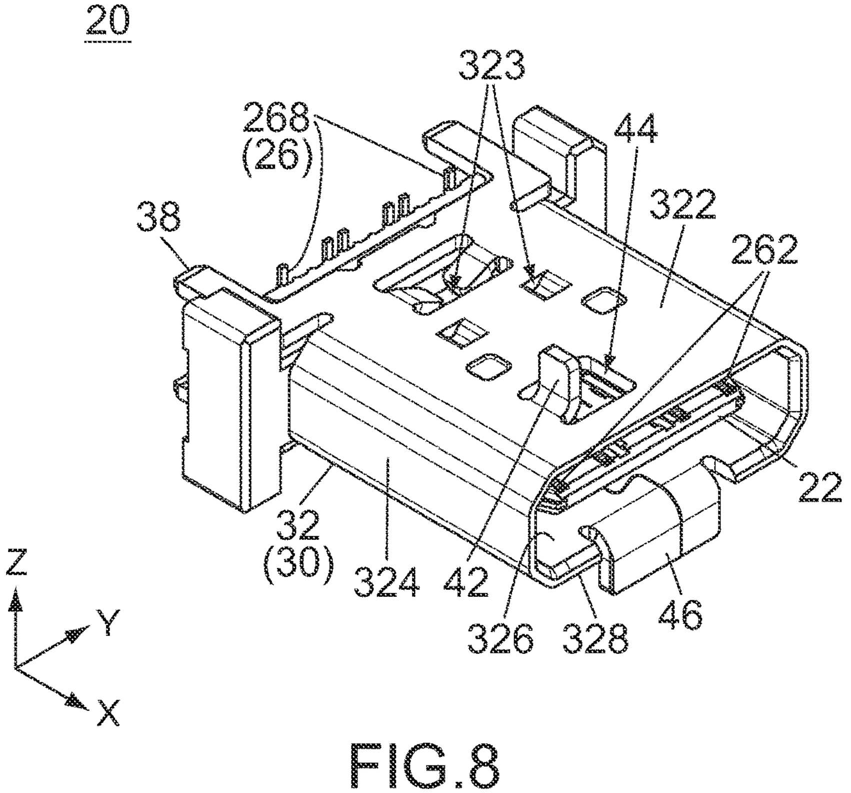
FIG. 8 is another perspective view showing the first connector of FIG. 7.
Figure 9:
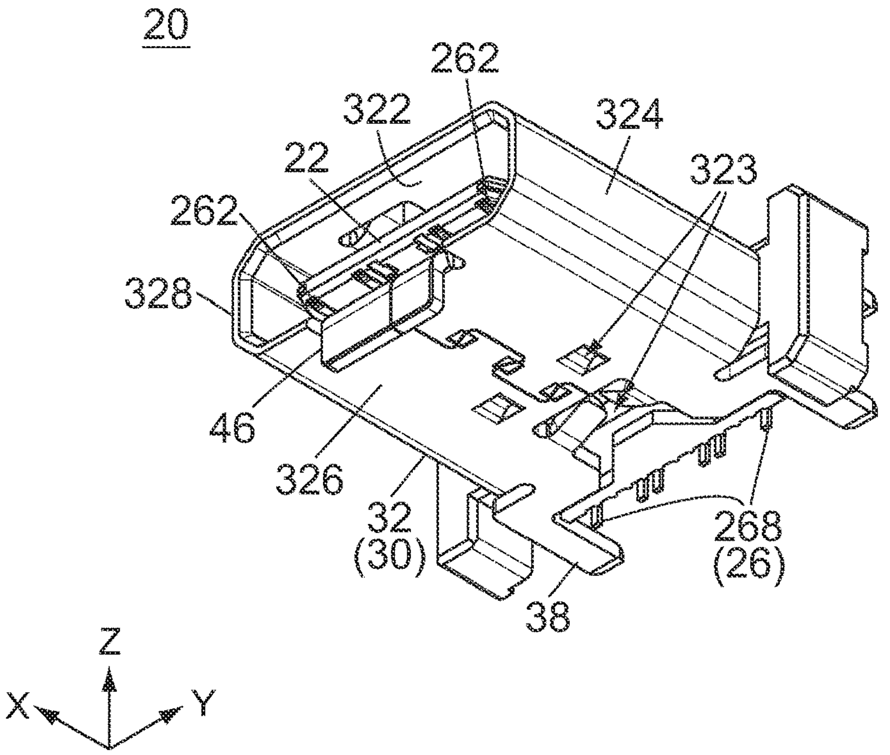
FIG. 9 is a still another perspective view showing the first connector of FIG. 7.

Referring to FIGS. 7 to 9, the first connector 20 of the present embodiment comprises a first holding member 22 made of insulator, two or more first terminals 26 each made of conductor and a first shell 30 made of conductor. However, the present invention is not limited thereto. For example, the first connector 20 may further comprise another member in addition to the aforementioned members.

Each of the first terminals 26 of the present embodiment has a first contact portion 262 and a first fixed portion 268. The first contact portions 262 are electrically connected with the second connector 50 (see FIG. 2) under the mated state. Referring to FIG. 7, each of the first fixed portions 268 of the present embodiment is fixed on and connected to a conductive pad 822 of the board 82 via soldering, etc. when the first connector 20 is mounted on the board 82. Each of the first terminals 26 of the present embodiment has the aforementioned structure. However, the structure of each of the first terminals 26 is not specifically limited, provided that each of the first terminals 26 has the first contact portion 262.

Referring to FIGS. 7 to 9, the first terminals 26 are held by the first holding member 22. The first contact portions 262 of the present embodiment are divided into two rows in the Z-direction. Two rows of the first contact portions 262 are arranged on opposite surfaces of a plate-like portion of the first holding member 22 in the Z-direction, respectively. More specifically, two rows of the first contact portions 262 of the present embodiment are arranged on upper and lower surfaces of the plate-like portion of the first holding member 22, respectively. The first contact portions 262 of each row are arranged in the Y-direction. However, the present invention is not limited thereto. For example, all the first contact portions 262 may be arranged in a single row in the Y-direction.

Figure 11:
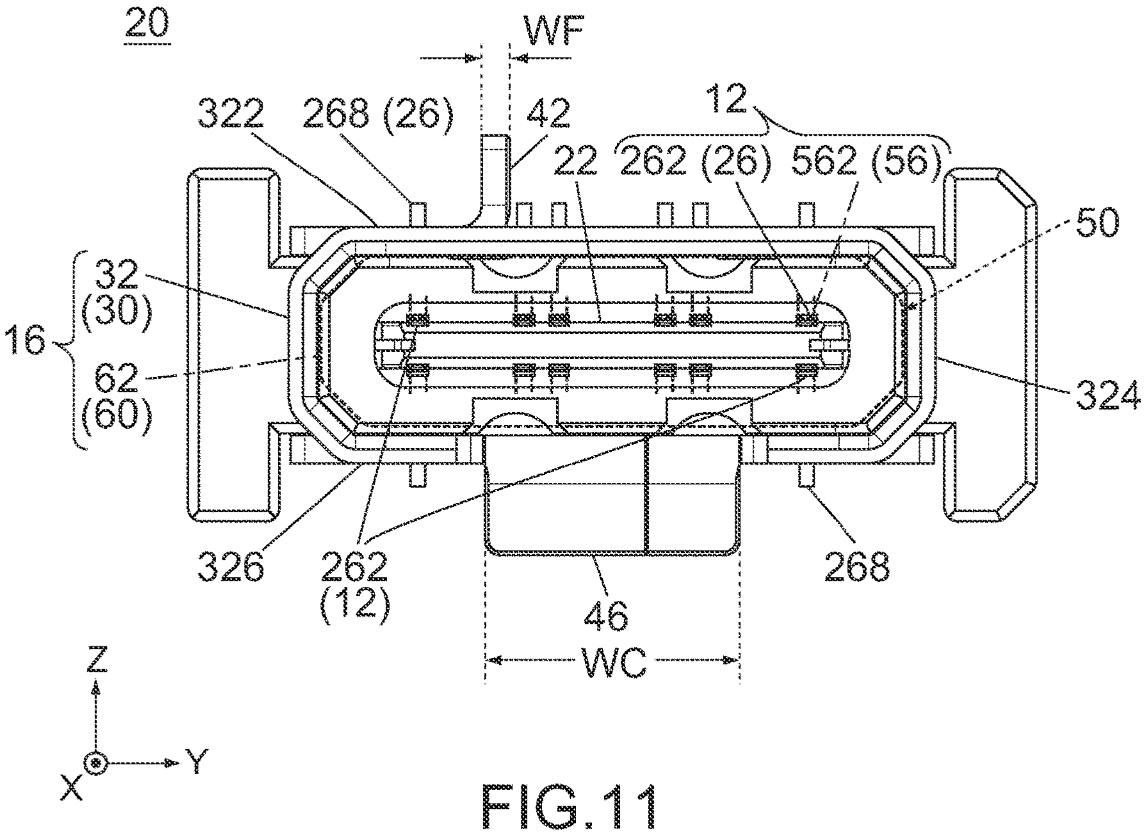
FIG. 11 is a front view showing the first connector of FIG. 7, wherein outlines of a second mateable portion and second terminals of the second connector under the mated state are illustrated with dashed line.

Referring to FIG. 11 together with FIG. 6, the first terminals 26 are provided so as to correspond to the second terminals 56 of the second connector 50. Under the mated state, the first contact portions 262 are brought into contact with the second contact portions 562, respectively, and thereby the first connector 20 is electrically connected with the second connector 50. The number and the arrangement of the first terminals 26 are not specifically limited, provided that the first contact portions 262 are arranged so as to be in contact with the second contact portions 562, respectively, under the mated state.

Referring to FIGS. 7 to 9, the first shell 30 of the present embodiment is made of metal. In detail, the first shell 30 is a single metal plate with bends. However, the present invention is not limited thereto. For example, the first shell 30 may be formed of two or more members joined to each other.

The first shell 30 is attached to the first holding member 22. The first shell 30 of the present embodiment has a first mateable portion 32 and two or more fixed portions 38. When the first connector 20 is mounted on the board 82, each of the fixed portions 38 is inserted into a through-hole of the board 82 and is connected to a ground pattern (not shown). The first mateable portion 32 extends so as to be away from the fixed portions 38 in the X-direction and has an end 328 in the X-direction. The end 328 is farthest from the fixed portions 38 in the X-direction in comparison with the other parts of the first shell 30. The first shell 30 of the present embodiment has the aforementioned structure. However, the present invention is not limited thereto. For example, the arrangement of the fixed portions 38 can be variously modified as necessary.

The first mateable portion 32 of the present embodiment has a main plate 322, two side plates 324 and an opposite plate 326. The main plate 322 and the opposite plate 326 are located at opposite sides of the first mateable portion 32 in the Z-direction, respectively. More specifically, the main plate 322 of the present embodiment is located at an upper side of the first mateable portion 32. The opposite plate 326 of the present embodiment is located at a lower side of the first mateable portion 32. Each of the main plate 322 and the opposite plate 326 extends along the XY-plane. The side plates 324 are located at opposite sides of the first mateable portion 32 in the Y-direction, respectively. Each of the side plates 324 couples the main plate 322 and the opposite plate 326 to each other in the Z-direction. The first mateable portion 32 of the present embodiment has the aforementioned structure. However, the present invention is not limited thereto, but the structure of the first mateable portion 32 can be variously modified as necessary.

The first mateable portion 32 of the present embodiment partially encloses the plate-like portion of the first holding member 22 in the YZ-plane. In the YZ-plane, the first mateable portion 32 partially encloses and electromagnetically shields the first contact portions 262 arranged on the plate-like portion of the first holding member 22. The main plate 322 of the present embodiment is formed with a first hole 44 and various holes 323. Each of the first hole 44 and the holes 323 passes through the main plate 322 in the Z-direction. In addition, the opposite plate 326 of the present embodiment is formed with the various holes 323. Each of the holes 323 passes through the opposite plate 326 in the Z-direction.

As described above, the first mateable portion 32 of the present embodiment does not entirely enclose the first contact portions 262 in the YZ-plane. However, the present invention is not limited thereto. For example, the first hole 44 and the holes 323 may be formed at such positions where they do not substantially degrade EMI prevention. Thus, the first mateable portion 32 should enclose, at least in part, the first contact portions 262 in the YZ-plane.

Figure 10:
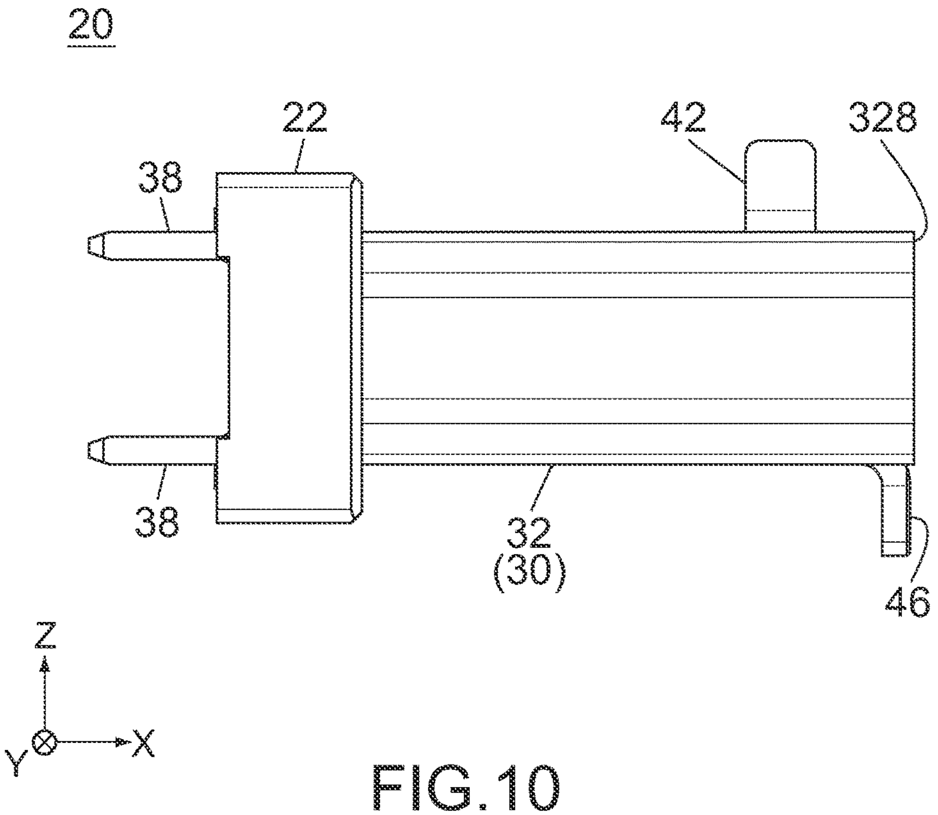
FIG. 10 is a side view showing the first connector of FIG. 7.

Referring to FIGS. 7, 8 and 10, the first shell 30 has a first key 42 in addition to the aforementioned portions. The first key 42 is a projection provided on the first mateable portion 32 and is located outward of the first mateable portion 32 in the YZ-plane. The first key 42 is apart from the end 328 of the first mateable portion 32 in the X-direction. The first key 42 of the present embodiment is a part of the first shell 30. In detail, the first key 42 of the present embodiment is formed by bending a part of the main plate 322. The thus-formed first key 42 has a thickness same as another thickness of the first shell 30. However, the present invention is not limited thereto. For example, the first key 42 may be formed separately from the first shell 30 and may be joined to the first shell 30.

The first key 42 of the present embodiment is connected to an edge of the first hole 44 in the Y-direction and projects outward from the main plate 322 in the Z-direction. The first key 42 has a flat-plate shape in parallel to a predetermined plane (XZ-plane). The first key 42 of the present embodiment has the aforementioned structure. However, the present invention is not limited thereto, but the structure of the first key 42 can be variously modified as necessary. For example, the first key 42 may be oblique to the XZ-plane.

Referring to FIGS. 7 to 10, the first connector 20 of the present embodiment has a stopper 46 in addition to the already explained portions. The stopper 46 of the present embodiment is provided on the first mateable portion 32 and is located outward of the first mateable portion 32 in the YZ-plane. The stopper 46 of the present embodiment is a part of the first shell 30. In detail, the stopper 46 of the present embodiment is formed by bending a part of the opposite plate 326. The thus-formed stopper 46 has a thickness same as the thickness of the first shell 30. However, the present embodiment is not limited thereto. For example, the stopper 46 may be formed separately from the first shell 30 and may be joined to the first shell 30.

The stopper 46 of the present embodiment is connected to the end 328 of the opposite plate 326 and projects outward from the opposite plate 326 in the Z-direction. The stopper 46 has a flat-plate shape in parallel to the YZ-plane. The stopper 46 of the present embodiment has the aforementioned structure. However, the present invention is not limited thereto, but the structure of the stopper 46 can be variously modified as necessary. For example, the stopper 46 may be oblique to the YZ-plane.

Hereafter, explanation will be made about a mating operation in which the second connector 50 is mated with the first connector 20.

Referring to FIG. 1, when the first connector 20 and the second connector 50 are under the separated state, the first mateable portion 32 of the first connector 20 faces the second mateable portion 62 of the second connector 50 straight along the X-direction. Referring to FIGS. 3 and 4, when the first connector 20 and the second connector 50 are under the separated state, the first key 42 of the first connector 20 faces the second key 744 of the second connector 50 straight along the X-direction. Thus, the first key 42 is located at a position which corresponds to the second key 744 in the YZ-plane. The projecting end 742 of the second connector 50 is located between the first connector 20 and the far end 722 in the X-direction when the first connector 20 and the second connector 50 are under the separated state.

Referring to FIG. 1 together with FIG. 2, when the second connector 50 is moved toward the first connector 20 along the X-direction under the separated state shown in FIG. 1, the end 628 of the second mateable portion 62 is inserted into the first mateable portion 32, and thereby the second mateable portion 62 is positioned relative to the first mateable portion 32. When the second connector 50 is kept being moved, the first key 42 of the first connector 20 is received in the second key 744 of the second connector 50. When the second connector 50 is further kept being moved, the first connector 20 and the second connector 50 take the mated state (see FIG. 2) where they are electrically connected with each other. Under the mated state, the second mateable portion 62 is received in the first mateable portion 32, and the first key 42 is received in the second key 744.

As can be seen from the explanation described above, according to the present embodiment, the first connector 20 can be mated with the proper second connector 50 by providing the first key 42 and the second key 744 which correspond to each other and are located at positions corresponding to each other in the YZ-plane. In other word, the connector assembly 10 of the present embodiment has mating keys which allow only the proper second connector 50 to be mated with the first connector 20. The mating keys of the present embodiment include the first key 42 of the first connector 20 and the second key 744 of the second connector 50. Incorrect mating can be prevented only by providing the first key 42 and the second key 744 to the connector assembly 10 without changing the structure of the member such as the second shell 60.

As shown in FIG. 6, the second key 744 of the present embodiment is not formed in the second mateable portion 62 of the second shell 60 but is formed in the housing 70 which is apart from the second mateable portion 62. Therefore, the second mateable portion 62 can be formed in a shape with no slit and thereby can enclose and electromagnetically shield all around the second contact portions 562 of the second terminals 56.

As shown in FIG. 11, the first key 42 of the present embodiment is located outward of the first mateable portion 32 of the first shell 30 in the YZ-plane. Therefore, the second mateable portion 62 can be received in the first mateable portion 32 under the mated state. The thus-received second mateable portion 62 forms a mated portion 16 together with the first mateable portion 32 and encloses all around the first contact portions 262 in addition to the second contact portions 562 in the YZ-plane. In other words, under the mated state, the second mateable portion 62 covers and electromagnetically shields all around a contact area 12, at which the first contact portions 262 are in contact with the second contact portions 562, in the YZ-plane. Thus, the present embodiment provides the connector assembly 10 which comprises the mating keys and is configured to prevent EMI.

Referring to FIGS. 3 and 4, according to the present embodiment, when the first connector 20 and the second connector 50 are under the separated state, a distance DS is shorter than a distance DK, wherein the distance DS is a distance between the end 328 of the first shell 30 and the end 628 of the second shell 60 in the X-direction under the separated state, and the distance DK is a distance between the first key 42 of the first connector 20 and the second key 744 of the second connector 50 in the X-direction under the separated state. In the mating operation, the end 628 of the second mateable portion 62 is inserted into the first mateable portion 32 before the first key 42 is received in the second key 744, and thereby the first key 42 is positioned relative to the second key 744. However, the present invention is not limited thereto. For example, the distance DS may be longer than the distance DK. More specifically, the end 628 may be located between the projecting end 742 and the far end 722 in the X-direction.

Explaining the aforementioned feature from another viewpoint, the second mateable portion 62 of the present embodiment extends beyond the projecting end 742 of the housing 70 in the X-direction. When the first connector 20 and the second connector 50 are under the separated state, the end 628 of the second mateable portion 62 is nearest to the first connector 20 in the X-direction in comparison with the other parts of the second connector 50. According to this arrangement, when the end 628 is just received in the first mateable portion 32 in the mating operation, it can be visually recognized whether the first key 42 in insertable into the second key 744 or not. Thus, according to the present embodiment, it can be easily considered whether the second connector 50 is mateable with the first connector 20 or not. However, the present invention is not limited thereto. For example, the projecting portion 74 of the housing 70 may extend beyond the end 628 of the second mateable portion 62 in the X-direction.

Referring to FIG. 3 together with FIGS. 6 and 11, a width WF (thickness) of the first key 42 when the first shell 30 is seen along the X-direction is smaller than a width WS of the second key 744 when the second shell 60 is seen along the X-direction. The thus-formed first key 42 is smoothly received in the second key 744 in the mating operation. However, the present invention is not limited thereto. For example, the width WF of the first key 42 may be equal to the width WS of the second key 744.

Figure 12:
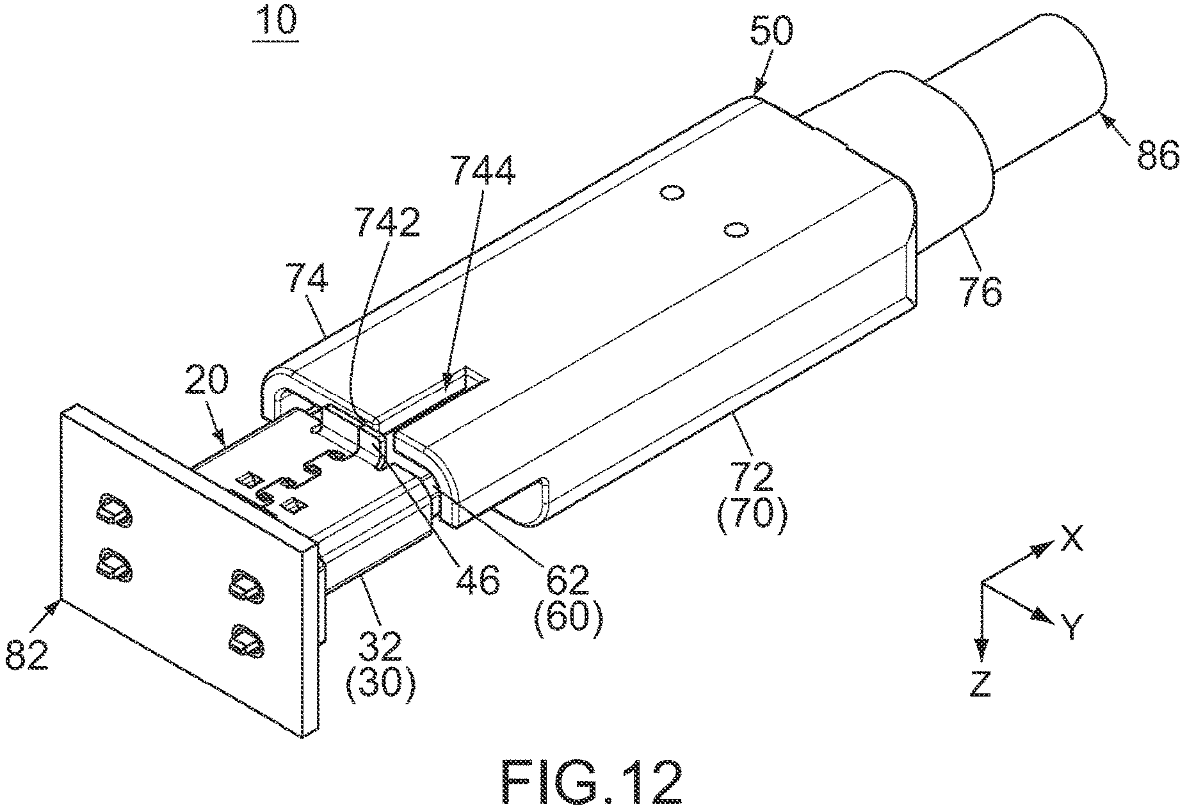
FIG. 12 is a perspective view showing the connector assembly of FIG. 1, wherein the second connector is arranged upside down relative to the second connector of FIG. 1, and an end of the second mateable portion of the second connector is received in a first mateable portion of the first connector.
Figure 13:
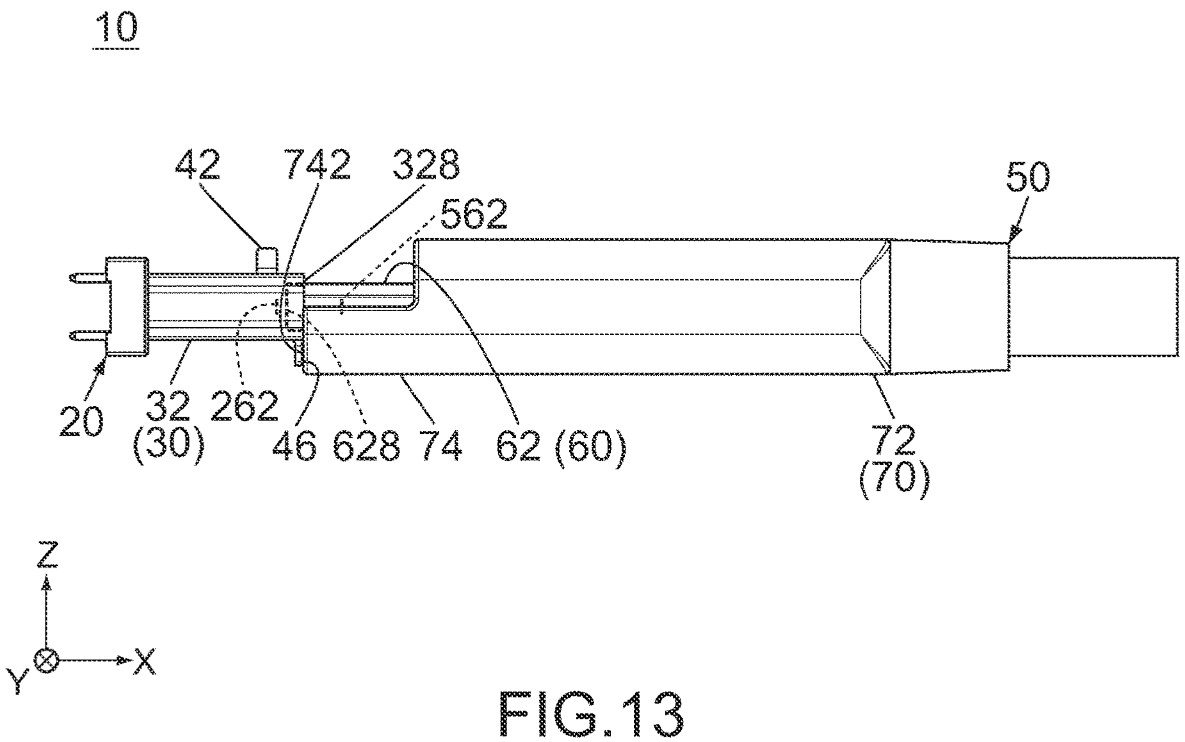
FIG. 13 is a side view showing the connector assembly of FIG. 12, wherein a projecting end of the second connector is in abutment with a stopper of the first connector, and a position of an end of the first contact portion of the first connector, a position of an end of a second shell of the second connector and a position of an end of the second contact portion of the second connector are illustrated with dashed line.

Referring to FIGS. 3 and 4 together with FIG. 2, the far end 722 of the second connector 50 is in contact with or faces the stopper 46 of the first connector 20 in the X-direction under the mated state. The stopper 46 of the first connector 20 is located between the projecting end 742 of the second connector 50 and the far end 722 in the X-direction under the mated state. Referring to FIGS. 12 and 13, the projecting end 742 and the stopper 46 which are arranged as described above prevent the second mateable portion 62 from being reversely mated with the first mateable portion 32.

In detail, upon an attempt to mate the second connector 50 with the first connector 20 under a state where the second connector 50 is reversed in the Z-direction, or is arranged upside down in the present embodiment, the projecting end 742 is brought into abutment with the stopper 46 to be stopped after the end 628 of the second mateable portion 62 is received into the first mateable portion 32. At that time, the second contact portions 562 are not in contact with the first contact portions 262. Thus, the projecting end 742 and the stopper 46 of the present embodiment work as a reverse-mating prevention mechanism which prevents the first connector 20 and the second connector 50 from being reversely mated with each other.

The stopper 46 of the present embodiment is located at a position same as that of the end 328 of the first shell 30 in the X-direction. According to this arrangement, the end 628 of the second mateable portion 62 is received in the first mateable portion 32 before the projecting end 742 is brought into abutment with the stopper 46. However, the present invention is not limited thereto. For example, when the projecting end 742 is brought into abutment with the stopper 46, the end 628 of the second mateable portion 62 may not be received in the first mateable portion 32. More specifically, the stopper 46 may protrude from the end 328 toward the second connector 50 in the X-direction.

Referring to FIG. 6, the second mateable portion 62 has a 180-degree rotationally symmetrical shape in the YZ-plane. In addition, the inner structure such as the second holding member 52 located in the second mateable portion 62 has a 180-degree rotationally symmetrical shape in the YZ-plane. Thus, the second mateable portion 62 of the present embodiment has a shape which is insertable into the first mateable portion 32 even when arranged upside down. However, the pin assignment of two rows of the second contact portions 562 is not 180-degree rotationally symmetrical in the YZ-plane. Referring to FIGS. 12 and 13, if the second connector 50 can be mated with the first connector 20 upside down, the thus-mated connector assembly 10 does not work as designed. According to the present embodiment, since the reverse-mating prevention mechanism including the projecting end 742 and the stopper 46 is provided, the first connector 20 and the second connector 50 can be reliably prevented from being reversely mated with each other.

Referring to FIG. 2, the receiving portion 58 of the second connector 50 of the present embodiment partially receives the first connector 20 under the mated state. Since the receiving portion 58 is provided, the second connector 50 can be mated with the first connector 20 even in the present instance where the projecting portion 74 projects toward the first connector 20.

As shown in FIG. 11, when the first shell 30 is seen along the X-direction, the stopper 46 and the first key 42 are apart from each other. In other words, when the first shell 30 is seen along the X-direction, the stopper 46 does not overlap with the first key 42. According to this arrangement, the first connector 20 can be provided with two portions, i.e., the stopper 46 which works as the reverse-mating prevention mechanism and the first key 42 which works as the mating key. However, the present invention is not limited thereto. For example, the first connector 20 may have only the first key 42.

As shown in FIG. 11, the first mateable portion 32 has a size in the Y-direction which is larger than a size thereof in the Z-direction. When the first shell 30 is seen along the X-direction, the stopper 46 and the first key 42 of the present embodiment are located at opposite sides of the first mateable portion 32, respectively. More specifically, the stopper 46 of the present embodiment projects downward from a lower surface, or the opposite plate 326, of the first mateable portion 32, and the first key 42 of the present embodiment projects upward from an upper surface, or the main plate 322, of the first mateable portion 32. According to this arrangement, even if the first mateable portion 32 has a small size in the Y-direction, the two portions, i.e., the stopper 46 and the first key 42, can be easily provided. However, the present embodiment is not limited thereto. For example, the first key 42 may project outward in the Y-direction from a side surface, or the side plate 324, of the first mateable portion 32 in the Y-direction. The stopper 46 and the first key 42 may be arranged in the Y-direction.

Referring to FIG. 3 together with FIGS. 6 and 11, the width WS of the second key 744 when the second shell 60 is seen along the X-direction is smaller than a width WC of the stopper 46 when the first shell 30 is seen along the X-direction. Upon an attempt to mate the second connector 50 with the first connector 20 upside down, the thus-formed stopper 46 is not received in the second key 744 even when the stopper 46 is located at a position corresponding to the second key 744 in the YZ-plane. Thus, according to the present embodiment, the reverse mating can be more reliably prevented.

The width WC of the stopper 46 of the present embodiment is about a half of a size of the opposite plate 326 in the Y-direction and is sufficiently wide. The wide stopper 46 is hardly damaged when the projecting end 742 is stopped. However, the present invention is not limited thereto. For example, the first shell 30 may be provided with two or more of the stoppers 46. In this instance, each of the stoppers 46 may have a flat-plate shape in parallel to the XZ-plane similarly to the first key 42. Two or more of the stoppers 46 may be arranged in the Y-direction so that a distance between the stoppers 46 at opposite ends in the Y-direction is larger than the width WS of the second key 744. In this instance, the width WC of each of the stoppers 46 may be smaller than the width WS of the second key 744.

Referring to FIGS. 6 and 11, any one of the width WF of the first key 42, the width WS of the second key 744 and the width WC of the stopper 46 of the present embodiment is a size in the Y-direction. However, the present invention is not limited thereto. For example, when the first key 42 projects outward in the Y-direction from a side surface, or the side plate 324, of the first mateable portion 32, the width WF of the first key 42 is a size in the Z-direction.

The present embodiment can be further variously modified in addition to the already described various modifications. Hereafter, explanation will be made about a first modification of the present embodiment. The first modification can be further modified similarly to the present embodiment.

Figure 14:
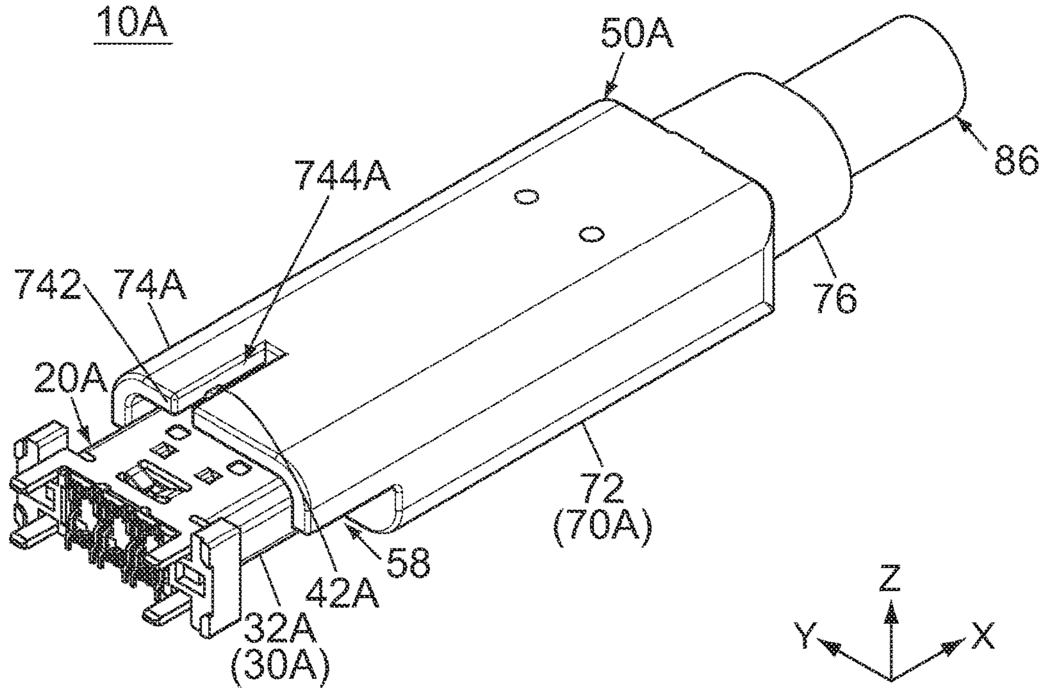
FIG. 14 is a perspective view showing a first modification of the connector assembly of FIG. 1, wherein a first connector and a second connector of the connector assembly are under a mated state where they are mated with each other.

Comparing FIG. 14 with FIG. 2, a connector assembly 10A of the first modification comprises a first connector 20A different from the first connector 20 and a second connector 50A different from the second connector 50. The first connector 20A is an on-board receptacle similar to the first connector 20. The second connector 50A is a cable plug similar to the second connector 50. The first connector 20A and the second connector 50A are mateable with each other along the mating direction (X-direction).

Figure 15:
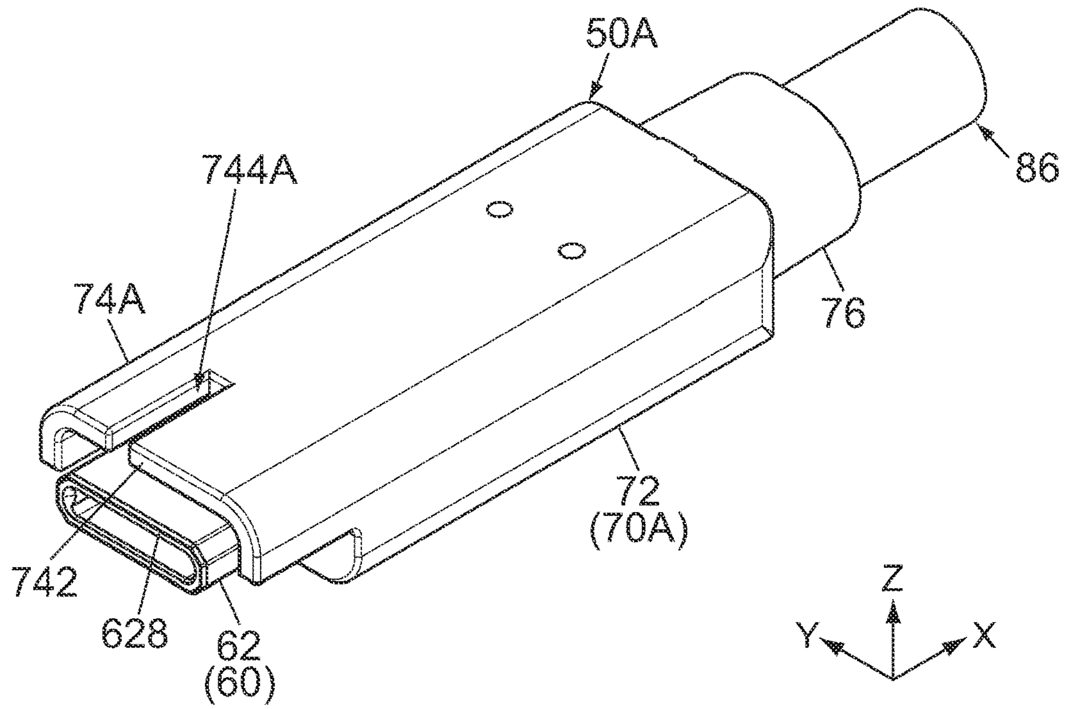
FIG. 15 is a perspective view showing the second connector of the connector assembly of FIG. 14.

Comparing FIG. 15 with FIG. 1, the second connector 50A comprises a housing 70A different from the housing 70 of the second connector 50. The housing 70A has a projecting portion 74A different from the projecting portion 74 of the housing 70. The projecting portion 74A is formed with a second key 744A. The second key 744A is a groove similar to the second key 744 and extends from the projecting end 742 along the X-direction. However, a position of the second key 744A in the Y-direction is different from the position of the second key 744 in the Y-direction. In detail, the second key 744 is located on one of opposite sides, or the negative Y-side, of the projecting portion 74 in the Y-direction, while the second key 744A is located on a remaining one of the opposite sides, or the positive Y-side, of the projecting portion 74A. The second connector 50A has a structure similar to that of the second connector 50 except for the aforementioned difference in position of the second key 744A.

Figure 16:
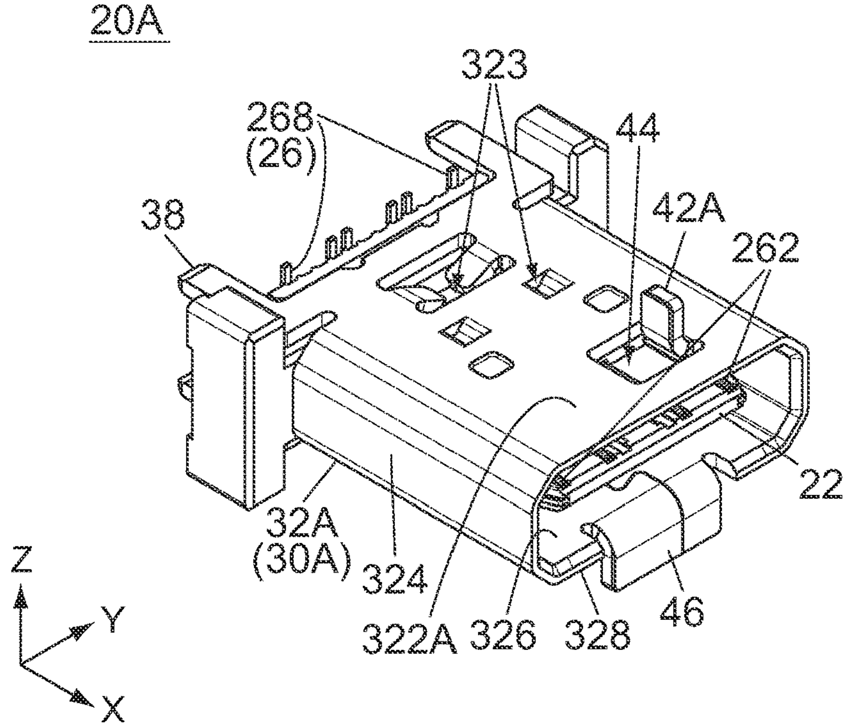
FIG. 16 is a perspective view showing the first connector of the connector assembly of FIG. 14.

Comparing FIG. 16 with FIG. 8, the first connector 20A comprises a first shell 30A different from the first shell 30 of the first connector 20. The first shell 30A has a first mateable portion 32A different from the first mateable portion 32 of the first shell 30 and has a first key 42A different from the first key 42 of the first shell 30.

The first mateable portion 32A has a main plate 322A different from the main plate 322 of the first mateable portion 32. The first key 42A is provided on the main plate 322A. The first key 42A is a projection provided on the first mateable portion 32A and is located outward of the first mateable portion 32A in the YZ-plane. The first key 42A has a structure similar to that of the first key 42. However, a position of the first key 42A in the Y-direction is different from the position of the first key 42 in the Y-direction. In detail, the first key 42 is located on one of opposite sides, or the negative Y-side, of the main plate 322 in the Y-direction, while the first key 42A is located on a remaining one of the opposite sides, or the positive Y-side, of the main plate 322A. The first connector 20A has a structure similar to that of the first connector 20 except for the aforementioned difference in position of the first key 42A.

Referring to FIG. 14, when the second connector 50A is moved toward the first connector 20A along the X-direction under the separated state, the second connector 50A is mated with the first connector 20A. Under the mated state, the second mateable portion 62 (see FIG. 15) is received in the first mateable portion 32A, and the first key 42A is received in the second key 744A.

Figure 17:
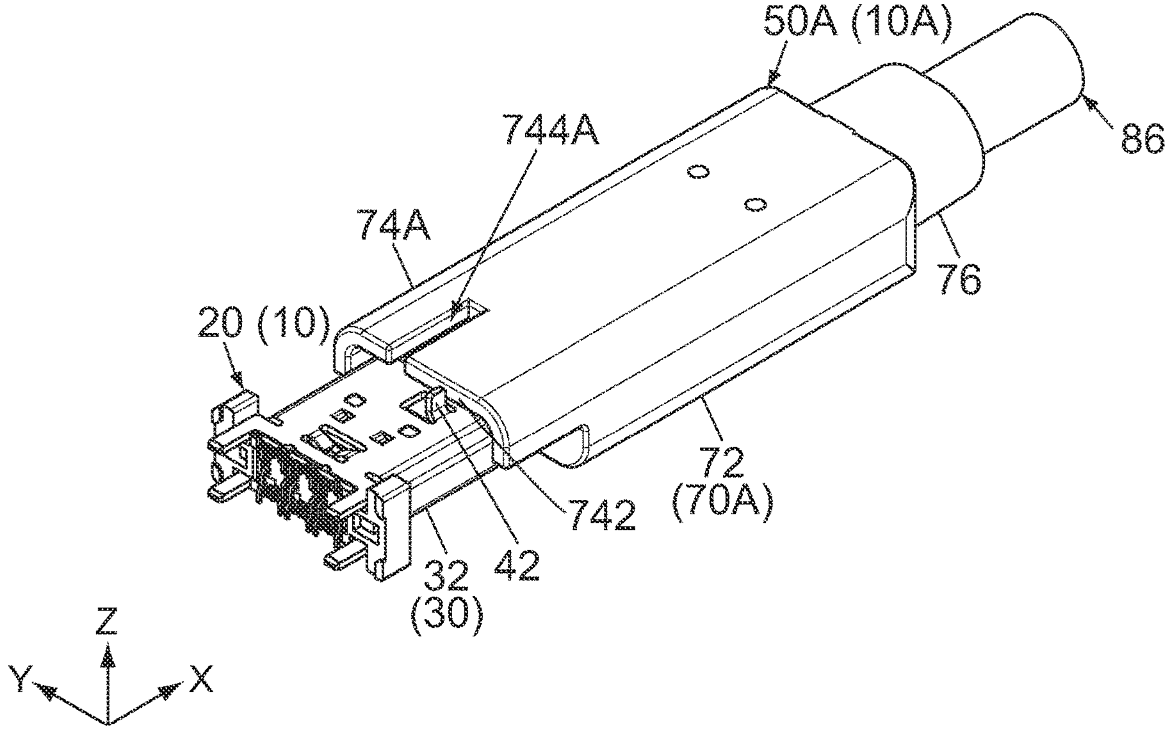
FIG. 17 is a perspective view showing the first connector of the connector assembly of FIG. 1 and the second connector of the connector assembly of FIG. 14, wherein an end of a second mateable portion of the second connector is received in a first mateable portion of the first connector.
Figure 18:
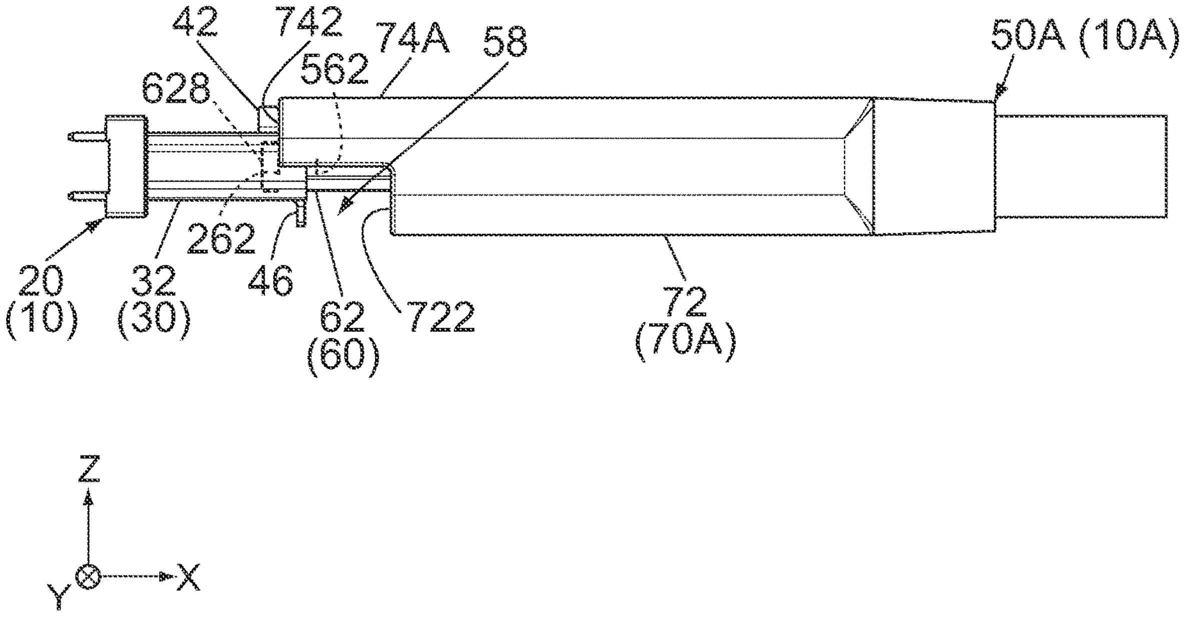
FIG. 18 is a side view showing the first connector and the second connector of FIG. 17, wherein a projecting end of the second connector is in abutment with a first key of the first connector, and a position of an end of the first contact portion of the first connector, a position of an end of a second shell of the second connector and a position of an end of the second contact portion of the second connector are illustrated with dashed line.

Referring to FIGS. 17 and 18 together with FIG. 1, when the second connector 50A of the connector assembly 10A is moved toward the first connector 20 of the connector assembly 10 under the separated state, the end 628 of the second shell 60 is received in the first mateable portion 32. Thereafter, the projecting end 742 is brought into abutment with the first key 42 before the first contact portions 262 are brought into contact with the second contact portions 562. Thus, in such an instance that the pin assignment of the second contact portions 562 of the second connector 50A does not correspond to the pin assignment of the first contact portions 262 of the first connector 20, the second connector 50A can be prevented from being mated with the first connector 20 when the second connector 50A is provided with the second key 744A which does not correspond to the first key 42.

Referring to FIG. 14, as described above, the connector assembly 10A of the present modification has mating keys which allow only the proper second connector 50A to be mated with the first connector 20A. The mating keys of the present modification include the first key 42A of the first connector 20A and the second key 744A of the second connector 50A. The present embodiment provides the connector assembly 10A which comprises the mating keys and is configured to prevent EMI.

Referring to FIGS. 15 and 16 together with FIG. 13, the projecting end 742 of the second connector 50A and the stopper 46 of the first connector 20A prevent the second mateable portion 62A from being reversely mated with the first mateable portion 32A similarly to the projecting end 742 of the second connector 50 and the stopper 46 of the first connector 20. Thus, the projecting end 742 and the stopper 46 of the present modification work as the reverse-mating prevention mechanism which prevents the first connector 20A and the second connector 50A from being reversely mated with each other.

Referring to FIGS. 8 and 16, the first connectors 20 and 20A comprise the first keys 42 and 42A of two types, respectively, which are different from each other in position in the Y-direction. The first keys 42 and 42A are located at positions different from each other, respectively. Referring to FIGS. 1 and 15, the second connectors 50 and 50A comprise the second keys 744 and 744A of two types, respectively, which can receive the first keys 42 and 42A, respectively. However, the present embodiment is not limited thereto. For example, the first keys of three or more types can be formed as necessary, and the second keys of three or more types can be formed as necessary. For example, the first key of another type may be located at the middle of the first mateable portion in the Y-direction, and the second key of another type may be located at the middle of the second mateable portion in the Y-direction.

Referring to FIG. 16, the stopper 46 and the first key 42A may be located on the same surface of the first mateable portion 32A, provided that the stopper 46 and the first key 42A are apart from each other when the first shell 30A is seen along the X-direction. For example, the stopper 46 and the first key 42A may project upward from an upper surface, or the main plate 322A, of the first mateable portion 32A. However, from a viewpoint of easy provision of the first keys of two or more types, the stopper 46 and the first key 42A are preferred to be located on different surfaces of the first mateable portion 32A, respectively, and are further preferred to be located on opposite surfaces of the first mateable portion 32A, respectively.

Hereafter, explanation will be made about six modifications of the present embodiment. The first connector of each modification has one of the aforementioned first keys 42 and 42A of two types (see FIGS. 2 and 14). The second connector of each modification has one of the aforementioned second keys 744 and 744A of two types (see FIGS. 2 and 14). Each modification can be further modified similarly to the present embodiment and the first modification.

Figure 19:
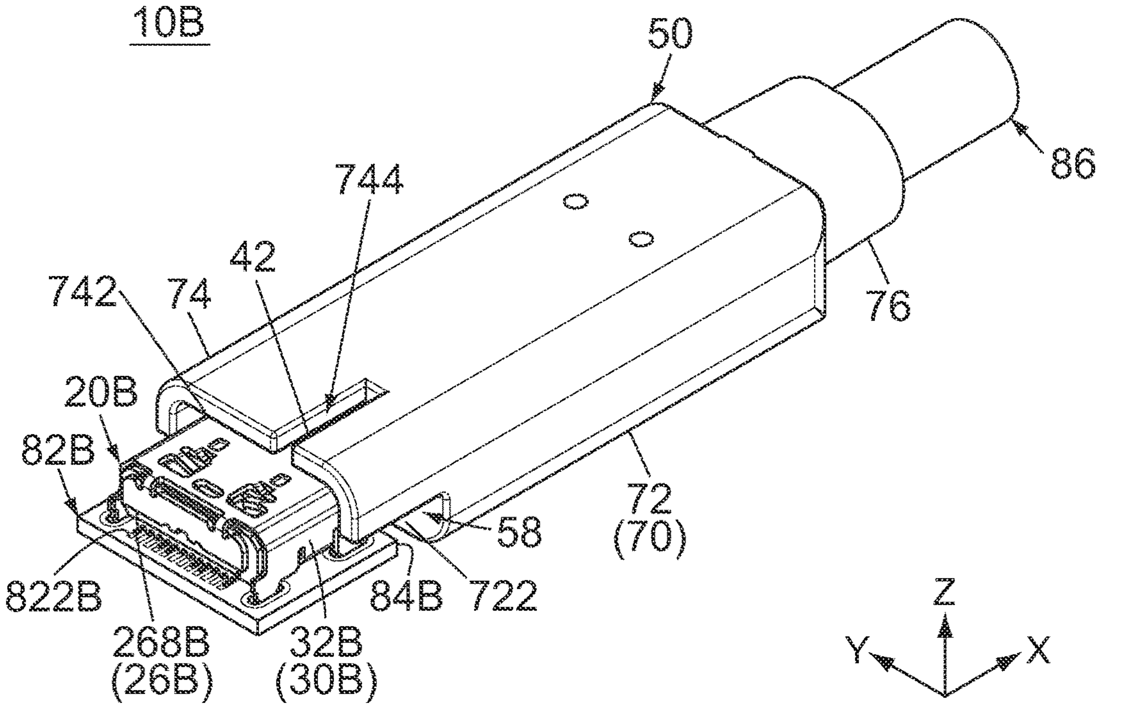
FIG. 19 is a perspective view showing a second modification of the connector assembly of FIG. 1, wherein a first connector and a second connector of the connector assembly are under a mated state where they are mated with each other.

Comparing FIG. 19 with FIG. 2, a connector assembly 10B of a second modification comprises a first connector 20B different from the first connector 20 and the second connector 50 same as that of the connector assembly 10. The first connector 20B is an on-board receptacle similar to the first connector 20. However, the first connector 20B is a so-called right angle connector different from the first connector 20. When the first connector 20B is used, the first connector 20B is mounted on a circuit board (board) 82B which extends in parallel to the XY-plane. The board 82B has an edge 84B in the X-direction. Thus, the first connector 20B is configured to be mounted on the board 82B which extends in parallel to the X-direction and has the edge 84B in the X-direction. The first connector 20B and the second connector 50 are mateable with each other along the mating direction (X-direction).

Figure 20:
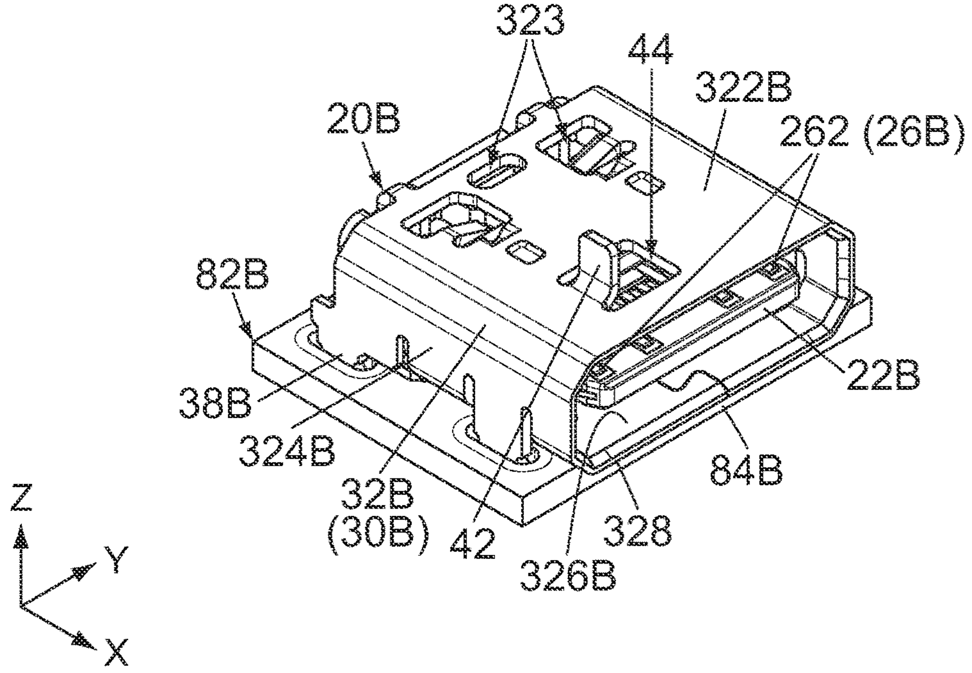
FIG. 20 is a perspective view showing the first connector of the connector assembly of FIG. 19.
Figure 21:
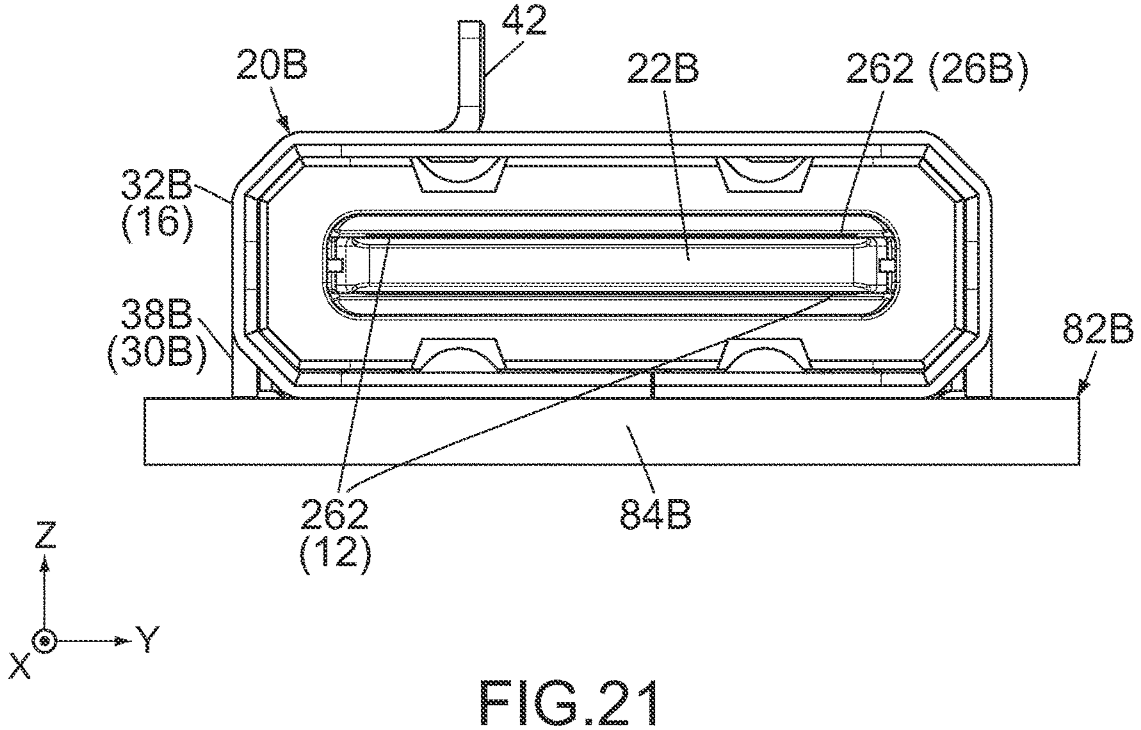
FIG. 21 is a front view showing the first connector of FIG. 20.

Comparing FIGS. 20 and 21 with FIG. 8, the first connector 20B comprises a first holding member 22B made of insulator, two or more first terminals 26B each made of conductor and a first shell 30B made of conductor similarly to the first connector 20. However, the first connector 20B does not have the stopper 46.

Referring to FIGS. 20 and 21 together with FIG. 19, the first terminals 26B are held by the first holding member 22B. Each of the first terminals 26B has the first contact portion 262 and a first fixed portion 268B. Each of the first fixed portions 268B is fixed on and connected to a conductive pad 822B of the board 82B via soldering etc. when the first connector 20B is mounted on the board 82B. Comparing FIG. 21 with FIG. 11, the first contact portions 262 of the first connector 20B are arranged on a plate-like portion of the first holding member 22B so as to form two rows similarly to the first contact portions 262 of the first connector 20. Under the mated state, each of the first contact portions 262 of the first connector 20B is brought into contact with the second contact portion 562 in the contact area 12 similarly to the first contact portions 262 of the first connector 20.

Referring to FIG. 20, the first shell 30B has a first mateable portion 32B, two or more fixed portions 38B and the first key 42. The first mateable portion 32B encloses, at least in part, the first contact portions 262 in the YZ-plane. The first mateable portion 32B has a main plate 322B, two side plates 324B and an opposite plate 326B. The main plate 322B and the opposite plate 326B are located at opposite sides of the first mateable portion 32B in the Z-direction, respectively. The side plates 324B are located at opposite sides of the first mateable portion 32B in the Y-direction, respectively. Each of the fixed portions 38B extends outward in the Z-direction from the side plate 324B. When the first connector 20B is mounted on the board 82B, each of the fixed portions 38B is inserted into a through-hole of the board 82B and is connected to a ground pattern (not shown).

Comparing FIG. 21 with FIG. 11, under the mated state, the first mateable portion 32B forms the mated portion 16 together with the second mateable portion 62 similarly to the first mateable portion 32 of the first connector 20. The mated portion 16 encloses and electromagnetically shields all around the contact area 12 in the YZ-plane.

Comparing FIG. 20 with FIG. 8, the first key 42 of the first connector 20B is a projection provided on the first mateable portion 32B and is located outward of the first mateable portion 32B in the YZ-plane. When the first connector 20B is mounted on the board 82B, the first mateable portion 32B is located between the board 82B and the first key 42 in the Z-direction. In other words, when the first connector 20B is mounted on the board 82B, the first key 42 of the first connector 20B is apart from the board 82B in the YZ-plane.

The first connector 20B has a structure similar to the first connector 20 except for the differences described above.

Referring to FIG. 19, when the second connector 50 is moved toward the first connector 20B along the X-direction under the separated state, the second connector 50 is mated with the first connector 20B. Under the mated state, the second mateable portion 62 (see FIG. 22) is received in the first mateable portion 32B, and the first key 42 is received in the second key 744. The connector assembly 10B of the present modification has mating keys which allow only the proper second connector 50 to be mated with the first connector 20B. The mating keys of the present modification include the first key 42 of the first connector 20B and the second key 744 of the second connector 50. The present modification provides the connector assembly 10B which comprises the mating keys and is configured to prevent EMI.

Referring to FIG. 19, the far end 722 of the second connector 50 is in contact with or faces the edge 84B of the board 82B in the X-direction under the mated state. The edge 84B of the board 82B is located between the projecting end 742 of the second connector 50 and the far end 722 in the X-direction under the mated state.

Figure 22:
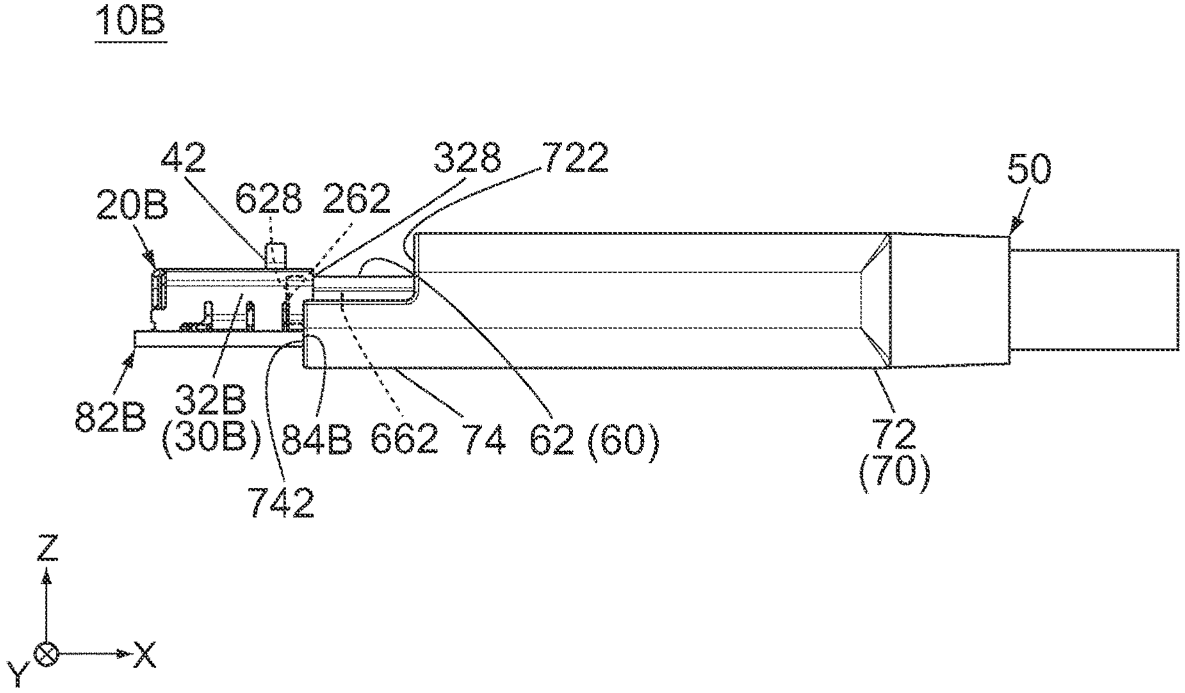
FIG. 22 is a side view showing the connector assembly of FIG. 19, wherein the second connector is arranged upside down relative to the second connector of FIG. 19, a projecting end of the second connector is in abutment with an edge of a board on which the first connector is mounted, and a position of an end of the first contact portion of the first connector, a position of an end of a second shell of the second connector and a position of an end of the second contact portion of the second connector are illustrated with dashed line.

Comparing FIG. 22 with FIG. 13, the projecting end 742 and the edge 84B which are arranged as described above work as the reverse-mating prevention mechanism which prevents the first connector 20B and the second connector 50 from being reversely mated with each other similarly to the projecting end 742 and the stopper 46 of the previously described embodiment. More specifically, upon an attempt to mate the second connector 50 with the first connector 20B upside down, the end 628 of the second shell 60 is received in the first mateable portion 32B, and then the projecting end 742 is brought into abutment with the edge 84B to be stopped before the second contact portions 562 are brought into contact with the first contact portions 262.

Figure 23:
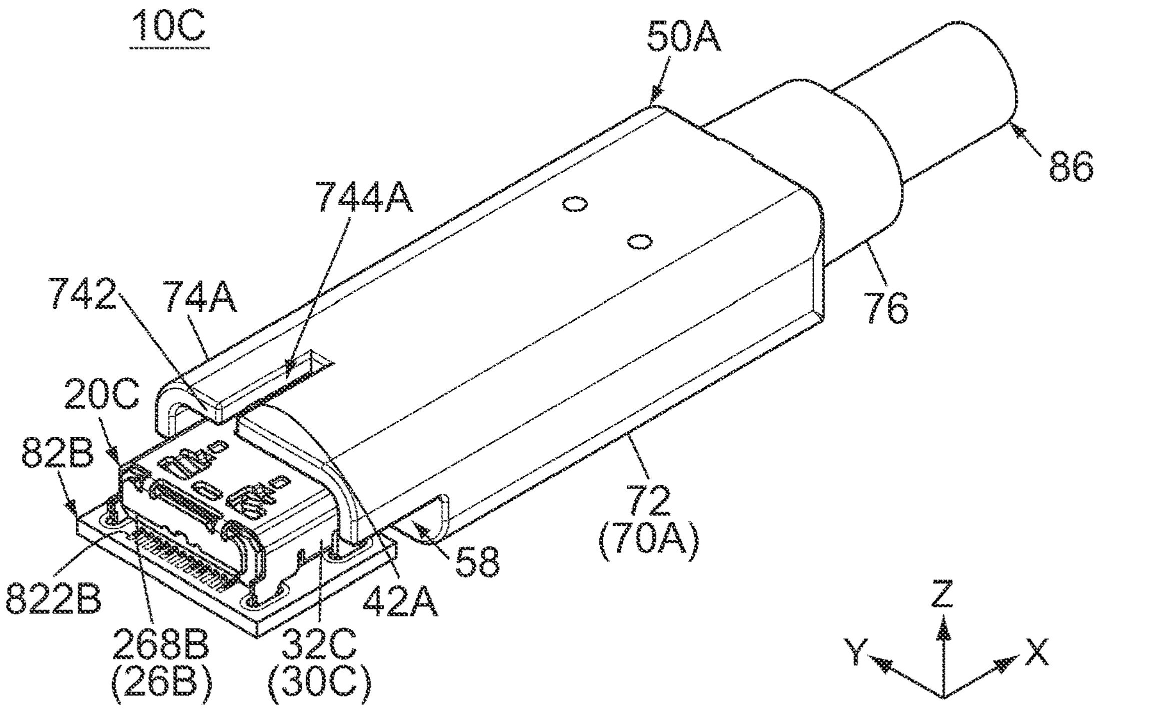
FIG. 23 is a perspective view showing a third modification of the connector assembly of FIG. 1, wherein a first connector and a second connector of the connector assembly are under a mated state where they are mated with each other.

Comparing FIG. 23 with FIGS. 14 and 19, a connector assembly 10C of a third modification comprises a first connector 20C different from the first connector 20B and the second connector 50A same as that of the connector assembly 10A. The first connector 20C is a right angle, on-board connector similar to the first connector 20B. The first connector 20C and the second connector 50A are mateable with each other along the mating direction (X-direction).

Figure 24:
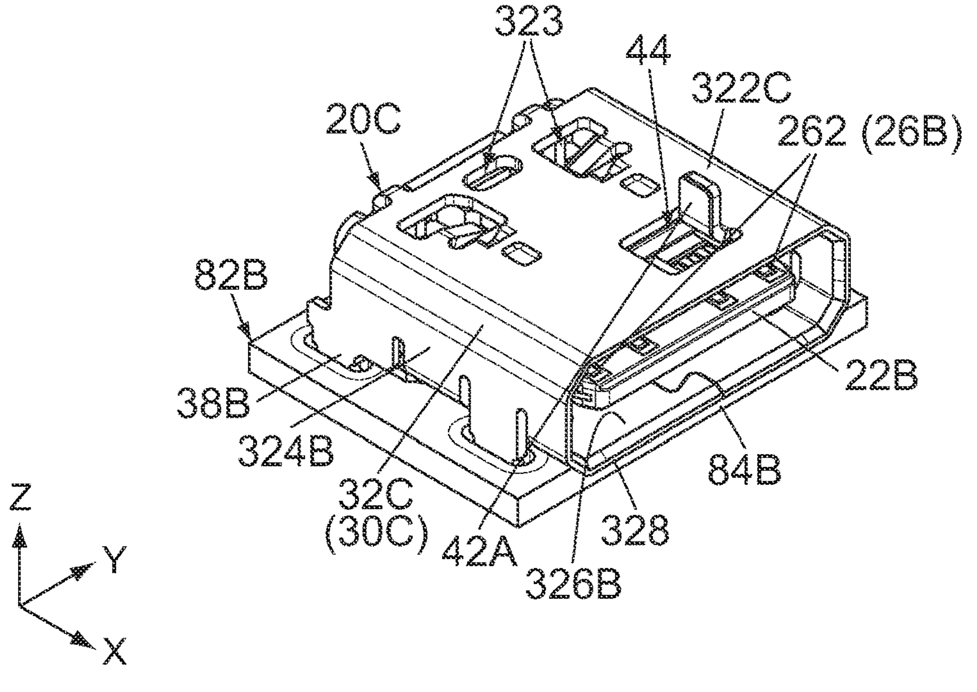
FIG. 24 is a perspective view showing the first connector of the connector assembly of FIG. 23.

Comparing FIG. 24 with FIG. 20, the first connector 20C comprises a first shell 30C different from the first shell 30B of the first connector 20B. The first shell 30C has the first key 42A and a first mateable portion 32C which is different from the first mateable portion 32B of the first shell 30B. The first mateable portion 32C has a main plate 322C different from the main plate 322B of the first mateable portion 32B. The first key 42A is provided on the main plate 322C. The first key 42A of the first connector 20C is a projection provided on the first mateable portion 32C and is located outward of the first mateable portion 32C in the YZ-plane. The first connector 20C has a structure similar to that of the first connector 20B except for the first key 42A which is provided instead of the first key 42.

Figure 25:
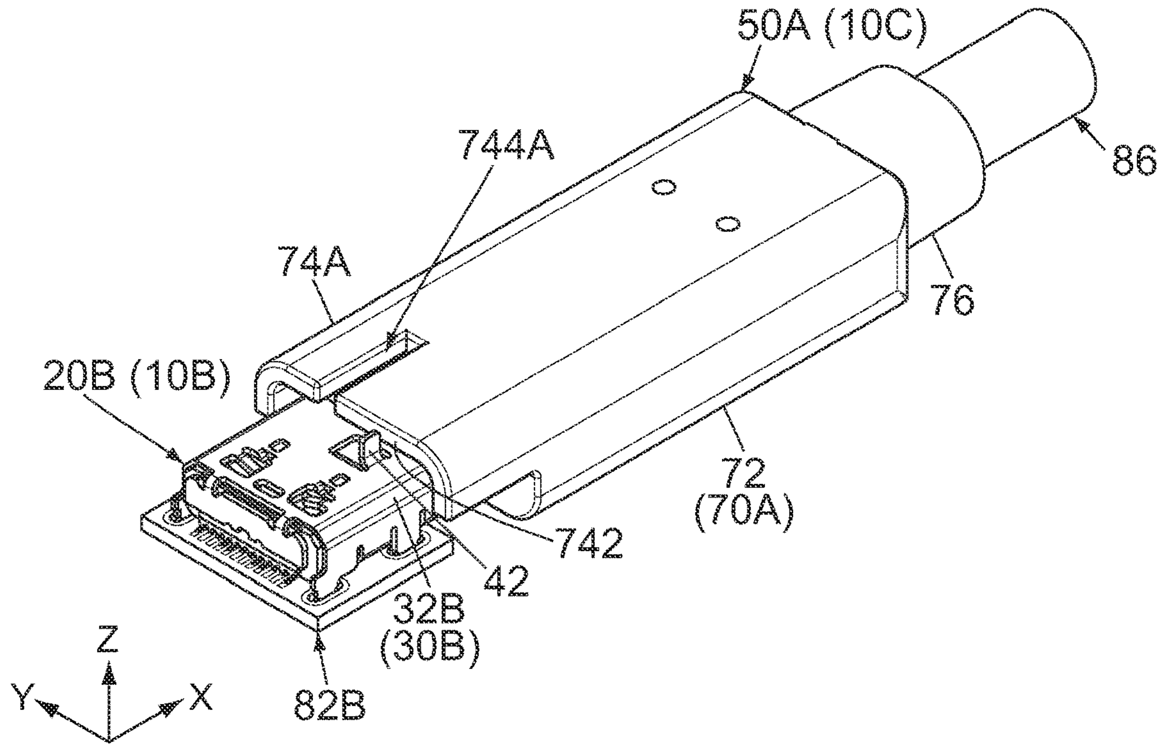
FIG. 25 is a perspective view showing the first connector of the connector assembly of FIG. 19 and the second connector of the connector assembly of FIG. 23, wherein an end of a second mateable portion of the second connector is received in a first mateable portion of the first connector.

Referring to FIG. 23, when the second connector 50A is moved toward the first connector 20C along the X-direction under the separated state, the first key 42A is received in the second key 744A, and the second connector 50A is mated with the first connector 20C. In contrast, referring to FIG. 25, when the second connector 50A of the connector assembly 10C is moved toward the first connector 20B of the connector assembly 10B under the separated state, the end 628 (see FIG. 18) of the second shell 60 is received in the first mateable portion 32B, and then the projecting end 742 is brought into abutment with the first key 42 before the first contact portions 262 (see FIG. 20) are brought into contact with the second contact portions 562 (see FIG. 18). The mechanism described above prevents the first connector 20B and the second connector 50A from being mated with each other.

Referring to FIG. 23, as described above, the connector assembly 10C of the present modification has mating keys which allow only the proper second connector 50A to be mated with the first connector 20C. The mating keys of the present modification include the first key 42A of the first connector 20C and the second key 744A of the second connector 50A. The present modification provides the connector assembly 10C which comprises the mating keys and is configured to prevent EMI.

Figure 26:
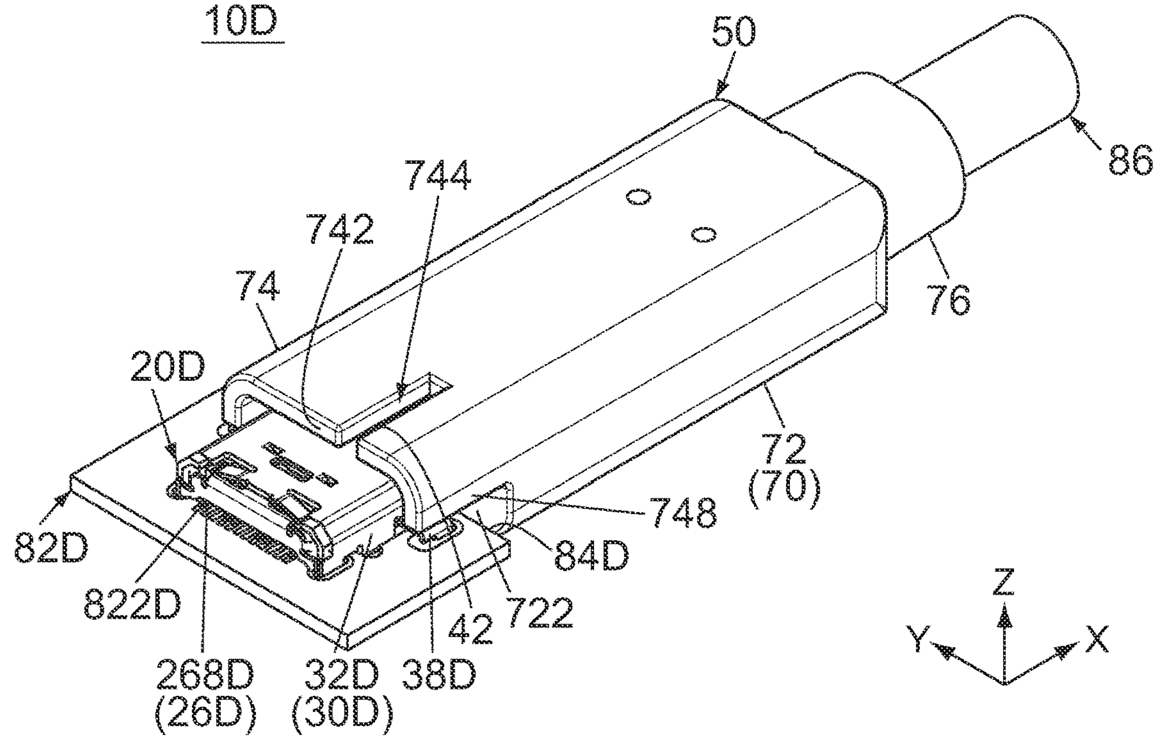
FIG. 26 is a perspective view showing a fourth modification of the connector assembly of FIG. 1, wherein a first connector and a second connector of the connector assembly are under a mated state where they are mated with each other.

Comparing FIG. 26 with FIG. 19, a connector assembly 10D of a fourth modification comprises a first connector 20D different from the first connector 20B and the second connector 50 same as that of the connector assembly 10B. The first connector 20D is a receptacle similar to the first connector 20B. However, the first connector 20D is a so-called drop-in connector different from the first connector 20B. The first connector 20D and the second connector 50 are mateable with each other along the mating direction (X-direction).

Figure 27:
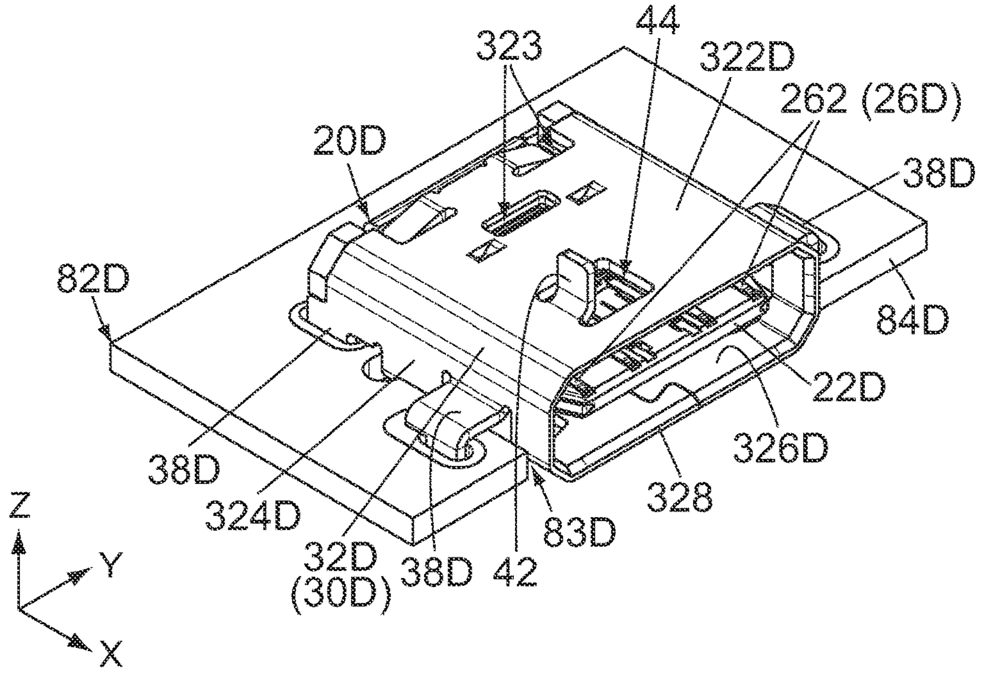
FIG. 27 is a perspective view showing the first connector of the connector assembly of FIG. 26.
Figure 28:
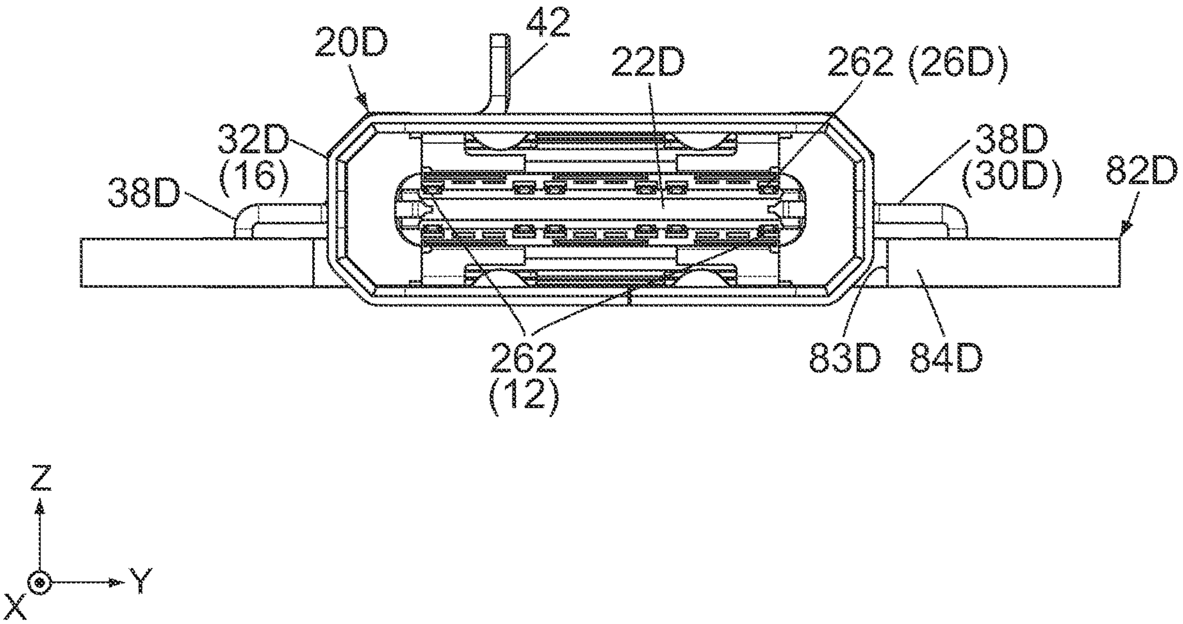
FIG. 28 is a front view showing the first connector of FIG. 27.

Referring to FIGS. 27 and 28, when the first connector 20D is used, the first connector 20D is mounted on a circuit board (board) 82D which extends in parallel to the XY-plane. The board 82D has an edge 84D in the X-direction. Thus, the first connector 20D is configured to be mounted on the board 82D which extends in parallel to the X-direction and has the edge 84D in the X-direction. The board 82D is formed with a cut 83D. The first connector 20D is partially received in the cut 83D when mounted on the board 82D.

Comparing FIGS. 27 and 28 with FIGS. 20 and 21, the first connector 20D comprises a first holding member 22D made of insulator, two or more first terminals 26D each made of conductor and a first shell 30D made of conductor similarly to the first connector 20B.

Referring to FIGS. 27 and 28 together with FIG. 26, the first terminals 26D are held by the first holding member 22D. Each of the first terminals 26D has the first contact portion 262 and a first fixed portion 268D. Each of the first fixed portions 268D is fixed on and connected to a conductive pad 822D of the board 82D when the first connector 20D is mounted on the board 82D with a part thereof dropped in the board 82D. Comparing FIG. 28 with FIG. 11, the first contact portions 262 of the first connector 20D are arranged on a plate-like portion of the first holding member 22D so as to form two rows similarly to the first contact portions 262 of the first connector 20. Under the mated state, each of the first contact portions 262 of the first connector 20D is brought into contact with the second contact portion 562 in the contact area 12 similarly to the first contact portions 262 of the first connector 20B.

Referring to FIG. 27, the first shell 30D has a first mateable portion 32D, two or more fixed portions 38D and the first key 42. The first mateable portion 32D encloses, at least in part, the first contact portions 262 in the YZ-plane. The first mateable portion 32D has a main plate 322D, two side plates 324D and an opposite plate 326D. The main plate 322D and the opposite plate 326D are located at opposite sides of the first mateable portion 32D in the Z-direction, respectively. The side plates 324D are located at opposite sides of the first mateable portion 32D in the Y-direction, respectively. Each of the fixed portions 38D extends from the side plate 324D toward the opposite plate 326D as a whole. Each of the fixed portions 38D is inserted into a through-hole of the board 82D and is connected to a ground pattern (not shown) when the first connector 20D is mounted on the board 82D with a part thereof dropped in the board 82D.

Comparing FIG. 28 with FIG. 11, under the mated state, the first mateable portion 32D forms the mated portion 16 together with the second mateable portion 62 similarly to the first mateable portion 32 of the first connector 20. The mated portion 16 encloses and electromagnetically shields all around the contact area 12 in the YZ-plane.

Comparing FIG. 27 with FIG. 20, the first key 42 of the first connector 20D is a projection provided on the first mateable portion 32D and is located outward of the first mateable portion 32D in the YZ-plane. When the first connector 20D is mounted on the board 82D, the first key 42 of the first connector 20D is apart from the board 82D in the YZ-plane.

The first connector 20D has a structure similar to that of the first connector 20B except for the differences described above.

Referring to FIG. 26, when the second connector 50 is moved toward the first connector 20D along the X-direction under the separated state, the second connector 50 is mated with the first connector 20D. Under the mated state, the second mateable portion 62 (see FIG. 29) is received in the first mateable portion 32D, and the first key 42 is received in the second key 744. The connector assembly 10D of the present modification has mating keys which allow only the proper second connector 50 to be mated with the first connector 20D. The mating keys of the present modification include the first key 42 of the first connector 20D and the second key 744 of the second connector 50. The present modification provides the connector assembly 10D which comprises the mating keys and is configured to prevent EMI.

Referring to FIG. 26, the far end 722 of the second connector 50 is in contact with or faces the edge 84D of the board 82D in the X-direction under the mated state. The edge 84D of the board 82D is located between the projecting end 742 of the second connector 50 and the far end 722 in the X-direction under the mated state.

Figure 29:
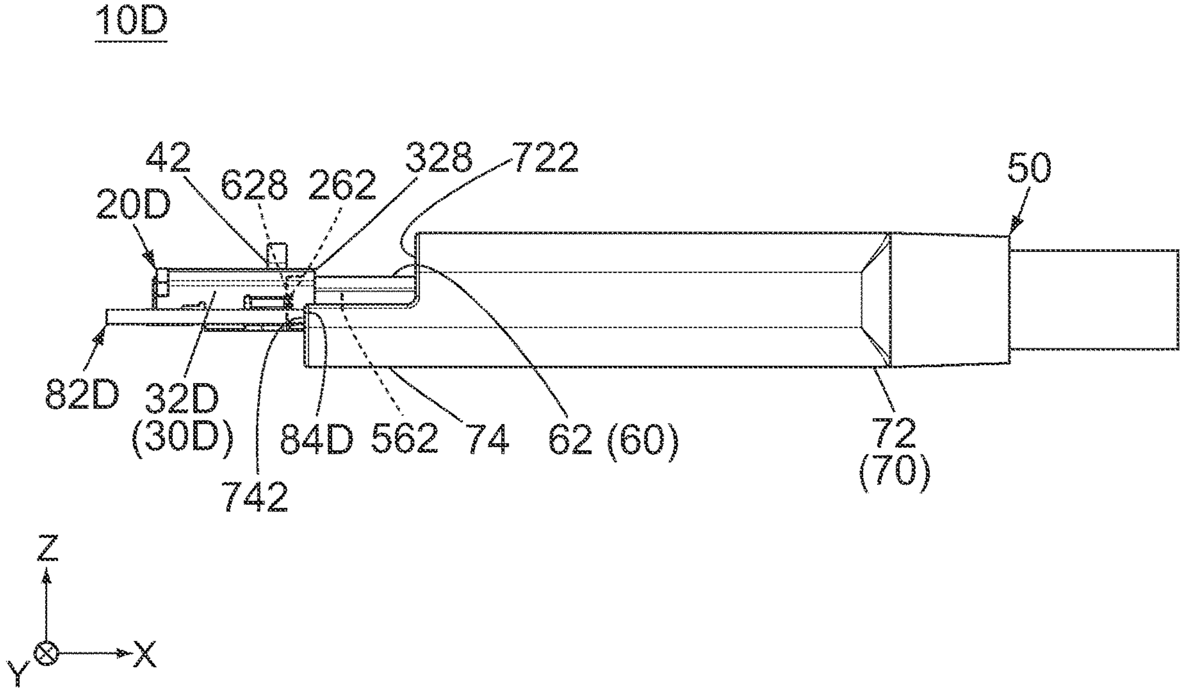
FIG. 29 is a side view showing the connector assembly of FIG. 26, wherein the second connector is arranged upside down relative to the second connector of FIG. 26, a projecting end of the second connector is in abutment with an edge of a board on which the first connector is mounted, and a position of an end of the first contact portion of the first connector, a position of an end of a second shell of the second connector and a position of an end of the second contact portion of the second connector are illustrated with dashed line.

Referring to FIG. 29, the projecting end 742 and the edge 84D which are arranged as described above work as the reverse-mating prevention mechanism which prevents the first connector 20D and the second connector 50 from being reversely mated with each other. More specifically, upon an attempt to mate the second connector 50 with the first connector 20D upside down, the end 628 of the second shell 60 is received in the first mateable portion 32D, and then the projecting end 742 is brought into abutment with the edge 84D to be stopped before the second contact portions 562 are brought into contact with the first contact portions 262.

Figure 30:
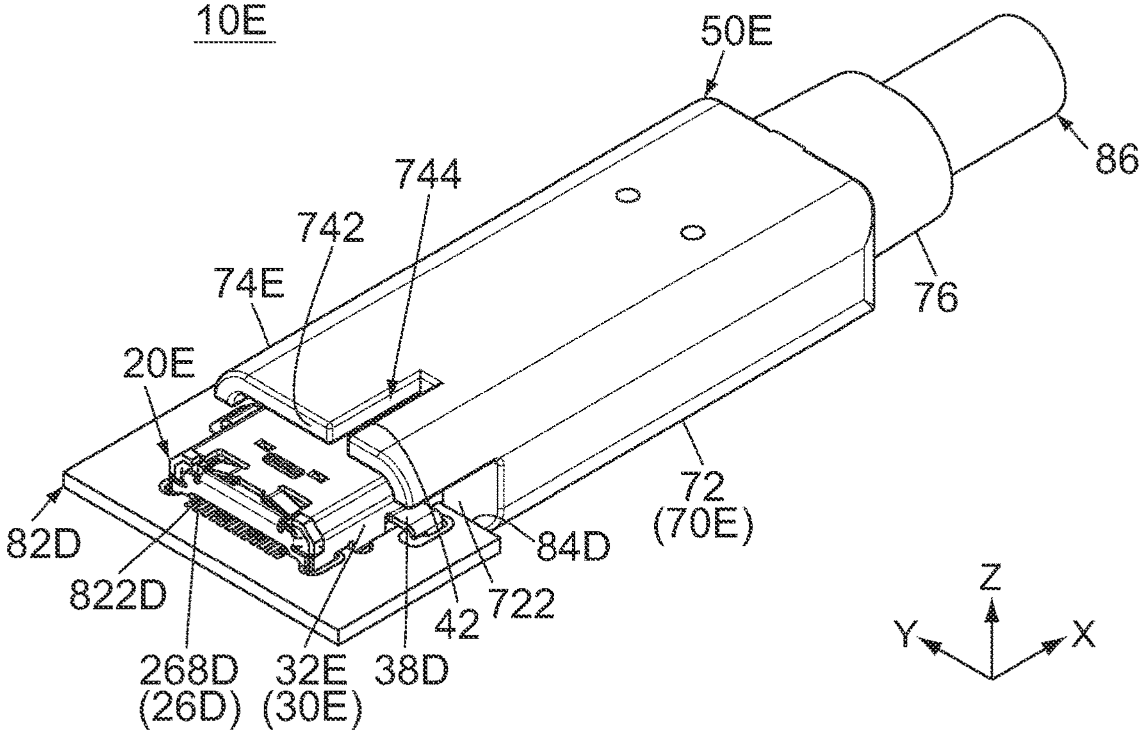
FIG. 30 is a perspective view showing a fifth modification of the connector assembly of FIG. 1, wherein a first connector and a second connector of the connector assembly are under a mated state where they are mated with each other.

Comparing FIG. 30 with FIG. 26, a connector assembly 10E of a fifth modification comprises a first connector 20E different from the first connector 20D and a second connector 50E different from the second connector 50. The first connector 20E is a drop-in receptacle similar to the first connector 20D. The second connector 50E is a cable plug similar to the second connector 50. The first connector 20E and the second connector 50E are mateable with each other along the mating direction (X-direction).

Figure 31:
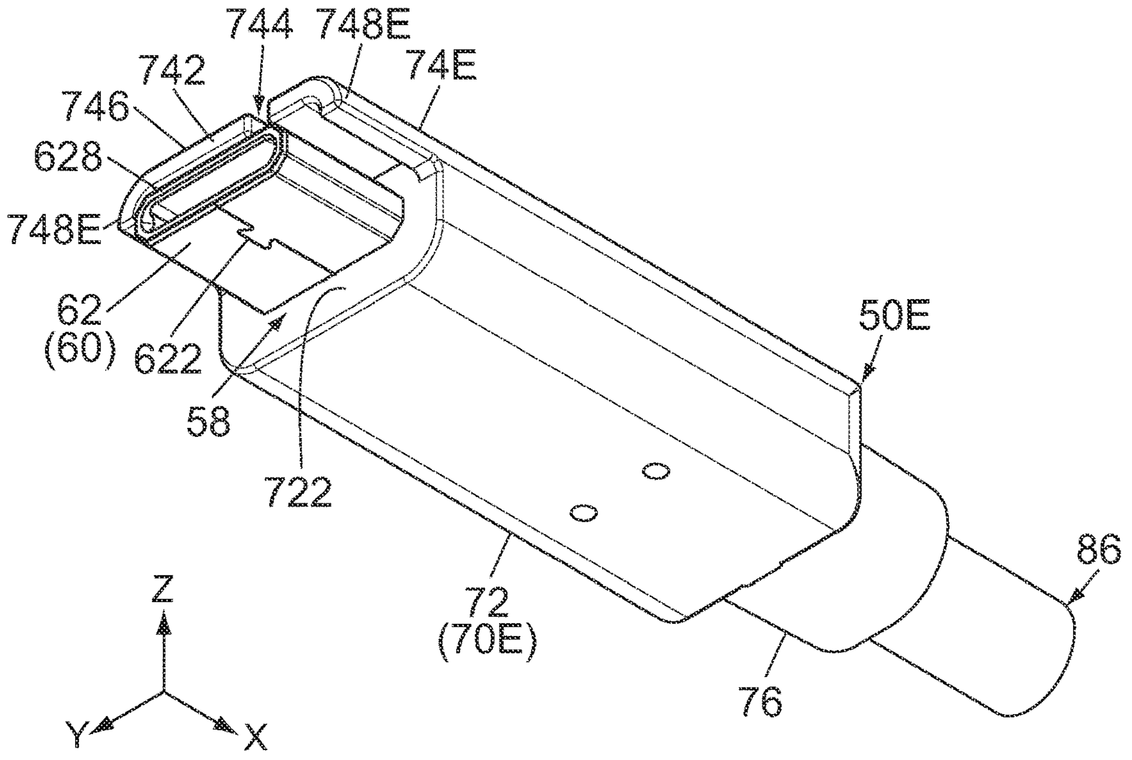
FIG. 31 is a perspective view showing the second connector of the connector assembly of FIG. 30.

Comparing FIG. 31 with FIG. 5, the second connector 50E comprises a housing 70E different from the housing 70 of the second connector 50. The housing 70E has a projecting portion 74E different from the projecting portion 74 of the housing 70. The projecting portion 74E has the main portion 746 same as that of the projecting portion 74 and two side portions 748E different from the side portions 748 of the projecting portion 74. The main portion 746 of the projecting portion 74E is formed with the second key 744 same as that of the projecting portion 74. Each of the side portions 748E has a size in the Z-direction which is smaller than another size of each of the side portions 748 in the Z-direction. The second connector 50A has a structure similar to that of the second connector 50 except for the side portions 748E which are provided instead of the side portions 748.

Figure 32:
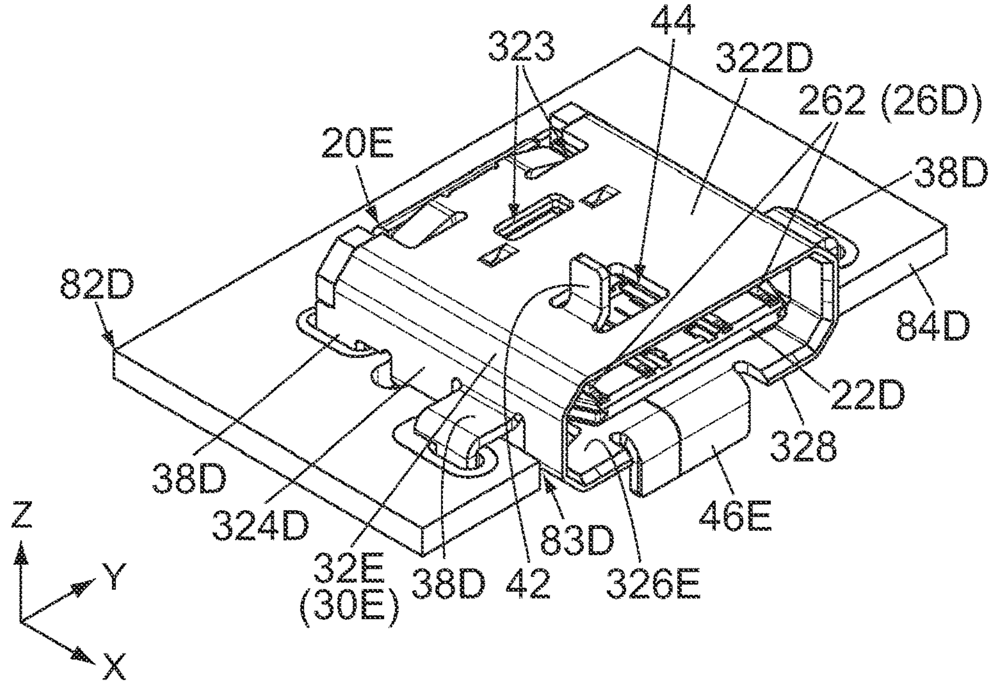
FIG. 32 is a perspective view showing the first connector of the connector assembly of FIG. 30.

Comparing FIG. 32 with FIG. 27, the first connector 20E comprises a first shell 30E different from the first shell 30D of the first connector 20D. The first shell 30E has a first mateable portion 32E which is different from the first mateable portion 32D of the first shell 30D, the first key 42 same as that of the first shell 30D and a stopper 46E which is not provided on the first shell 30D.

The first mateable portion 32E has an opposite plate 326E different from the opposite plate 326D of the first mateable portion 32D. The stopper 46E is connected to the vicinity of the end 328 of the opposite plate 326E and extends so as to be away from the main plate 322D in the Z-direction. Thus, the stopper 46E is provided on the first mateable portion 32E and is located outward of the first mateable portion 32E in the YZ-plane. The stopper 46E is located at a position same as that of the end 328 of the first shell 30E in the X-direction. The first connector 20E has a structure similar to that of the first connector 20D except for the thus-provided stopper 46E.

Referring to FIG. 30, when the second connector 50E is moved toward the first connector 20E along the X-direction under the separated state, the second connector 50E is mated with the first connector 20E. Under the mated state, the second mateable portion 62 (see FIG. 31) is received in the first mateable portion 32E, and the first key 42 is received in the second key 744. The connector assembly 10E of the present modification has mating keys which allow only the proper second connector 50E to be mated with the first connector 20E. The mating keys of the present modification include the first key 42 of the first connector 20E and the second key 744 of the second connector 50E. The present modification provides the connector assembly 10E which comprises the mating keys and is configured to prevent EMI.

Referring to FIG. 30 together with FIG. 32, the far end 722 of the second connector 50E is in contact with or faces the stopper 46E of the first connector 20E in the X-direction under the mated state. The stopper 46E is located between the projecting end 742 of the second connector 50E and the far end 722 in the X-direction under the mated state.

Figure 34:
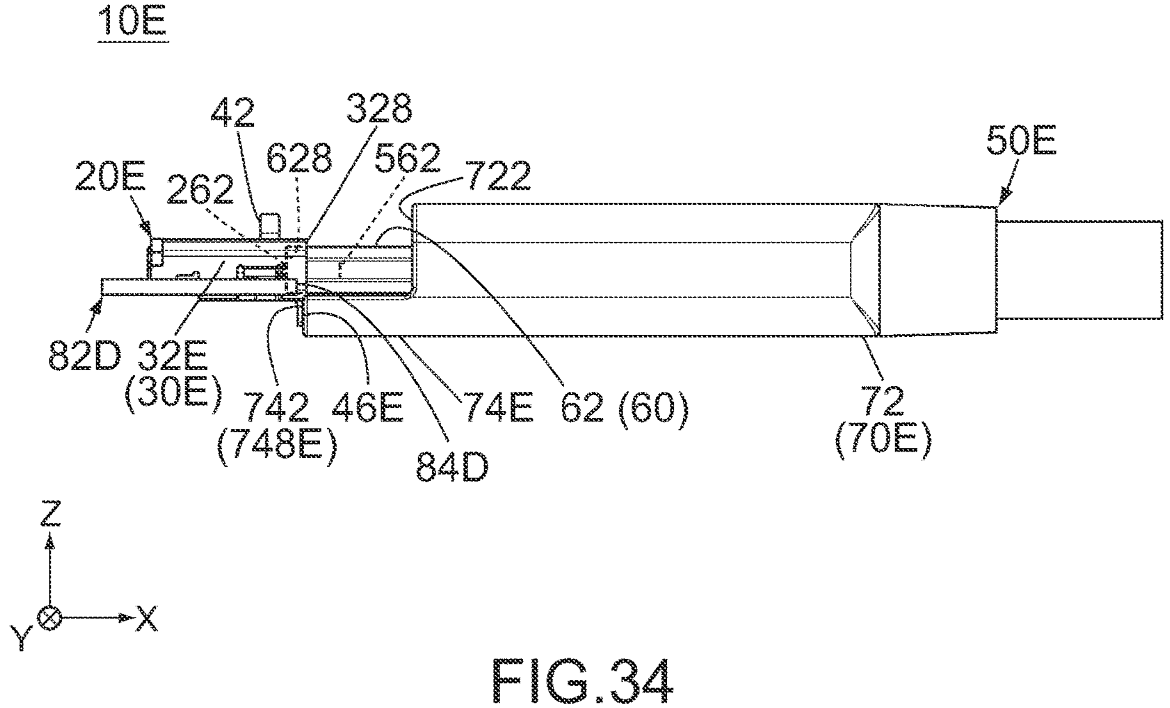
FIG. 34 is a side view showing the connector assembly of FIG. 30, wherein the second connector is arranged upside down relative to the second connector of FIG. 30, a projecting end of the second connector is in abutment with a stopper of the first connector, and a position of an end of the first contact portion of the first connector, a position of an end of a second shell of the second connector and a position of an end of the second contact portion of the second connector are illustrated with dashed line.

Referring to FIG. 34, the projecting end 742 and the stopper 46E which are arranged as described above work as the reverse-mating prevention mechanism which prevents the first connector 20E and the second connector 50E from being reversely mated with each other. More specifically, upon an attempt to mate the second connector 50E with the first connector 20E upside down, the end 628 of the second shell 60 is received in the first mateable portion 32E, and then the projecting end 742 is brought into abutment with the stopper 46E to be stopped before the second contact portions 562 are brought into contact with the first contact portions 262.

Figure 33:
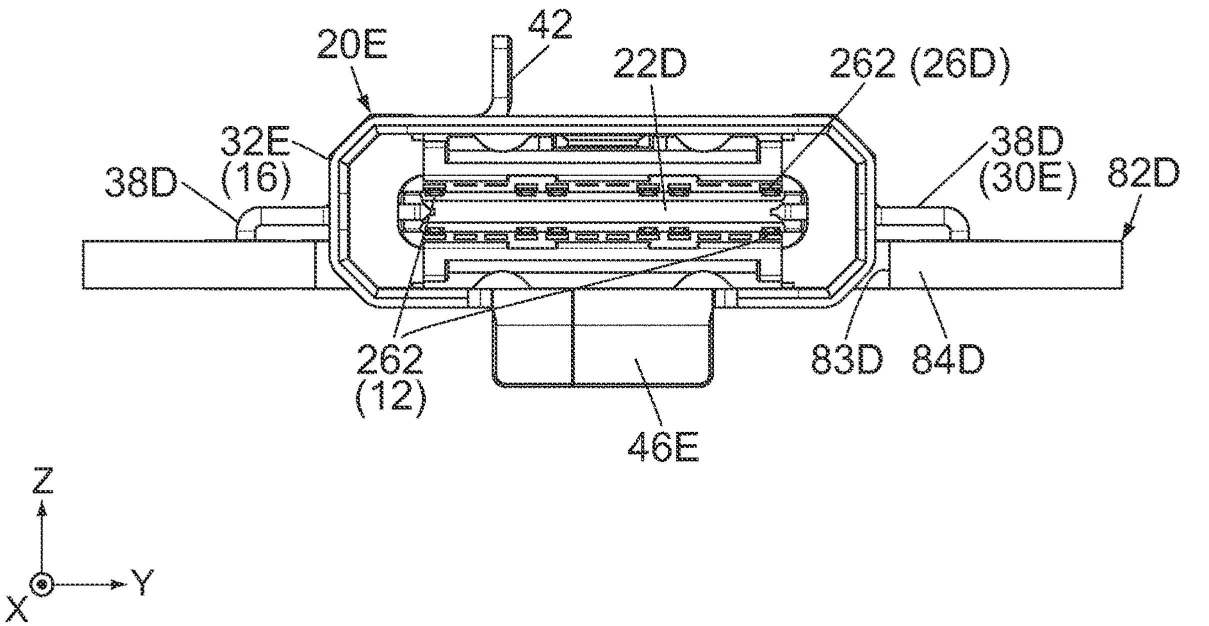
FIG. 33 is a front view showing the first connector of FIG. 32.

Referring to FIGS. 32 and 33, two of the fixed portions 38D of the first connector 20E extend outward in the Y-direction from the first mateable portion 32E and then fixed to the board 82D. The thus-formed two fixed portions 38D support opposite sides of the first mateable portion 32E which is received in the cut 83D of the board 82D.

Referring to FIGS. 27 and 28, the first connector 20D comprises two of the fixed portions 38D which are similarly formed as described above. Referring to FIG. 26, these two fixed portions 38D might be brought into abutment with the projecting end 742 of the side portion 748 of the projecting portion 74 when the second connector 50 is mated with the first connector 20D. In order to prevent such abutment, each of the side portions 748 illustrated in FIG. 26 is formed to have a size in the Z-direction slightly smaller than each of the side portions 748 illustrated in FIG. 5.

Referring to FIG. 31, each of the side portions 748E of the projecting portion 74E has a size in the Z-direction which is apparently smaller than each of the side portions 748 illustrated in FIG. 5. Comparing FIG. 30 with FIG. 26, the second connector 50E can be more smoothly mated with the first connector 20E than the second connector 50.

As can be seen from FIGS. 29 and 34, when each of the side portions 748E is reduced in size in the Z-direction, the edge 84D of the board 82D does not prevent the second mateable portion 62 from being reversely mated with the first mateable portion 32E. Accordingly, the first connector 20E needs to be provided with the stopper 46E. The size of each of the side portions 748E in the Z-direction is not limited to that of the present modification but should be properly designed in accordance with an arrangement of the first connector 20E relative to the board 82D.

Figure 35:
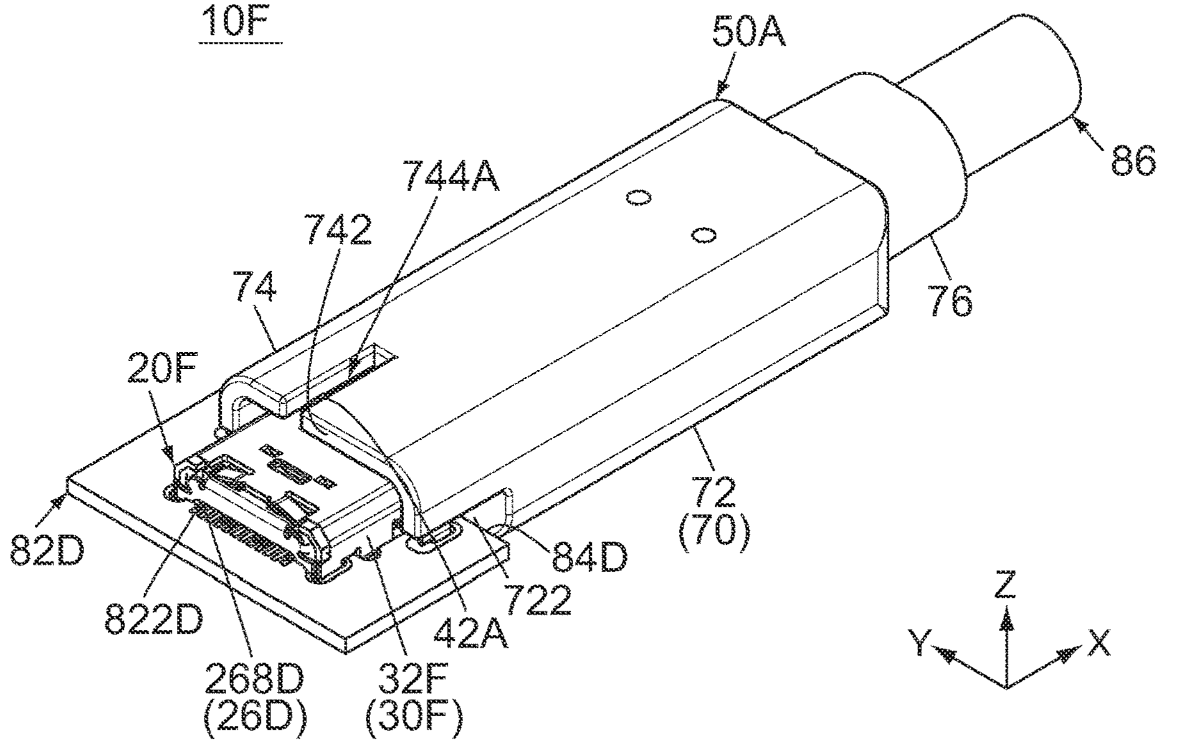
FIG. 35 is a perspective view showing a sixth modification of the connector assembly of FIG. 1, wherein a first connector and a second connector of the connector assembly are under a mated state where they are mated with each other.

Comparing FIG. 35 with FIGS. 14 and 26, a connector assembly 10F of a sixth modification comprises a first connector 20F different from the first connector 20D and the second connector 50A same as that of the connector assembly 10A. The first connector 20F is a drop-in receptacle similar to the first connector 20D. The first connector 20F and the second connector 50A are mateable with each other along the mating direction (X-direction).

Figure 36:
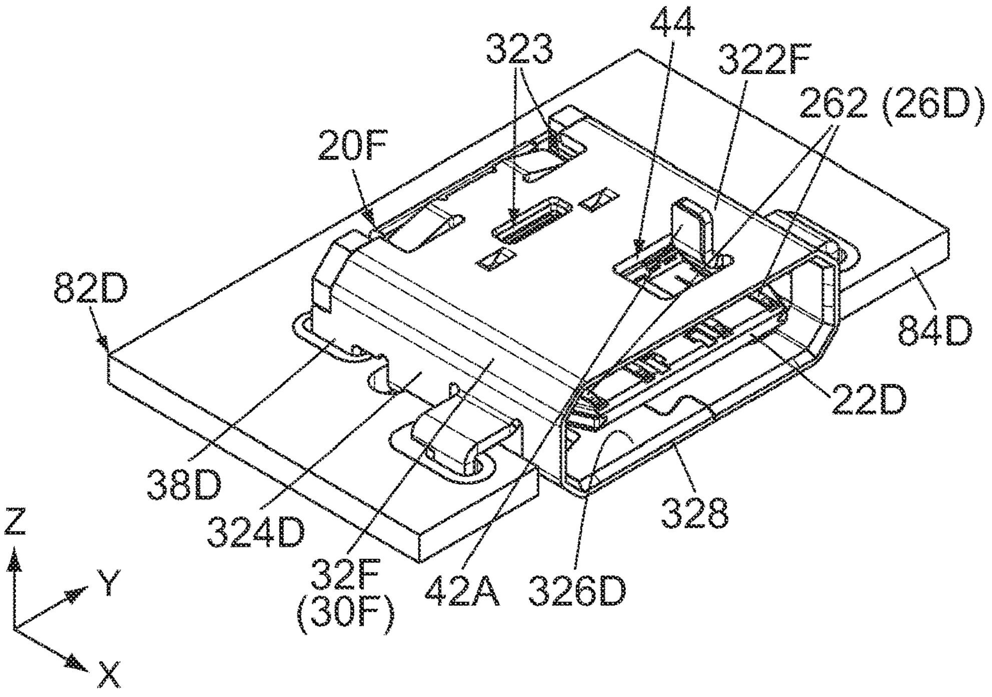
FIG. 36 is a perspective view showing the first connector of the connector assembly of FIG. 35.

Comparing FIG. 36 with FIG. 27, the first connector 20F comprises a first shell 30F different from the first shell 30D of the first connector 20D. The first shell 30F has a first mateable portion 32F different from the first mateable portion 32D of the first shell 30D and has the first key 42A different from the first key 42 of the first shell 30D. The first mateable portion 32F has a main plate 322F different from the main plate 322D of the first mateable portion 32D. The first key 42A is provided on the main plate 322F. The first key 42A of the first connector 20F is a projection provided on the first mateable portion 32F and is located outward of the first mateable portion 32F in the YZ-plane. The first connector 20F has a structure similar to that of the first connector 20D except for the first key 42A which is provided instead of the first key 42.

Figure 37:
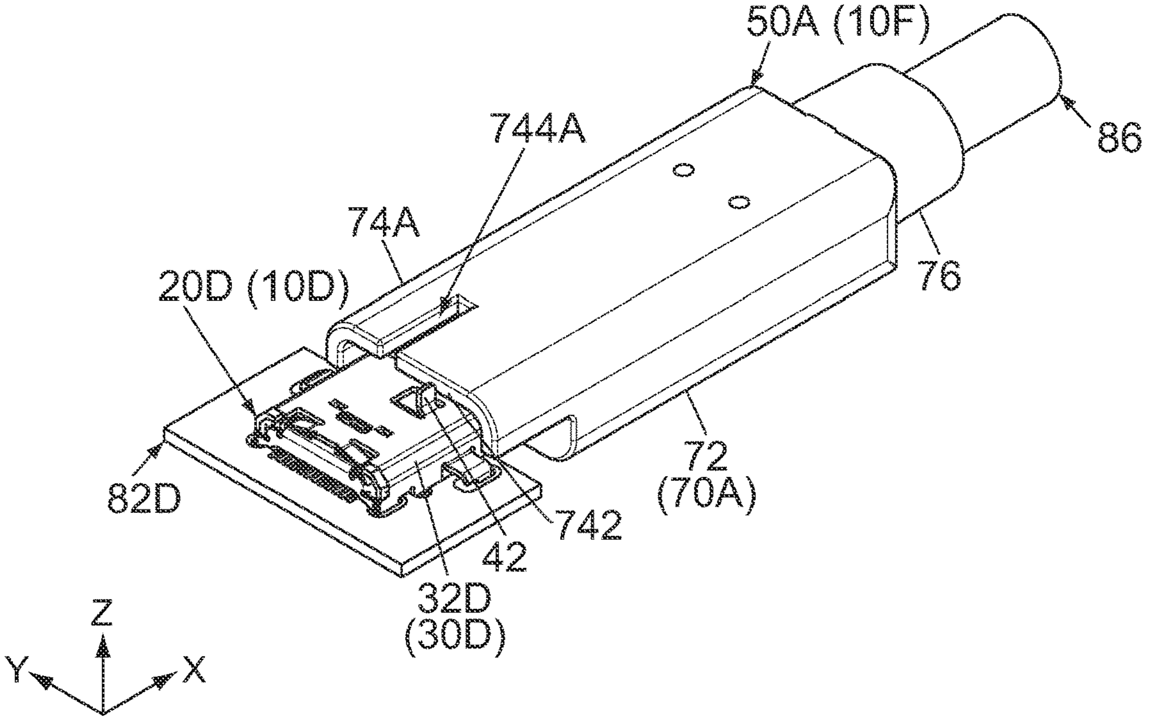
FIG. 37 is a perspective view showing the first connector of the connector assembly of FIG. 26 and the second connector of the connector assembly of FIG. 35, wherein an end of a second mateable portion of the second connector is received in a first mateable portion of the first connector.

Referring to FIG. 35, when the second connector 50A is moved toward the first connector 20F along the X-direction under the separated state, the first key 42A is received in the second key 744A, and the second connector 50A is mated with the first connector 20F. In contrast, referring to FIG. 37, when the second connector 50A of the connector assembly 10F is moved toward the first connector 20D of the connector assembly 10D under the separated state, the projecting end 742 is brought into abutment with the first key 42. The mechanism described above prevents the first connector 20D and the second connector 50A from being mated with each other.

Referring to FIG. 35, as described above, the connector assembly 10F of the present modification has mating keys which allow only the proper second connector 50A to be mated with the first connector 20F. The mating keys of the present modification include the first key 42A of the first connector 20F and the second key 744A of the second connector 50A. The present modification provides the connector assembly 10F which comprises the mating keys and is configured to prevent EMI.

Figure 38:
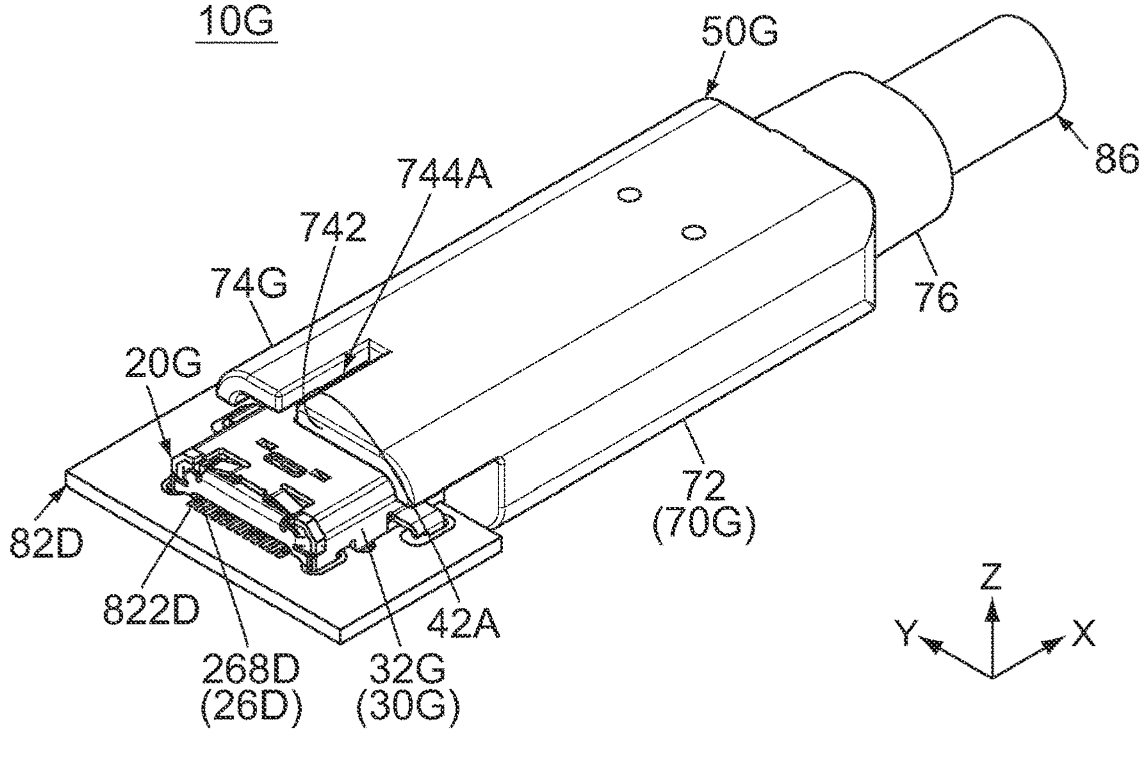
FIG. 38 is a perspective view showing a seventh modification of the connector assembly of FIG. 1, wherein a first connector and a second connector of the connector assembly are under a mated state where they are mated with each other.

Comparing FIG. 38 with FIG. 30, a connector assembly 10G of a seventh modification comprises a first connector 20G different from the first connector 20E and a second connector 50G different from the second connector 50E. The first connector 20G is a drop-in receptacle similar to the first connector 20E. The second connector 50G is a cable plug similar to the second connector 50E. The first connector 20G and the second connector 50G are mateable with each other along the mating direction (X-direction).

The second connector 50G comprises a housing 70G different from the housing 70E of the second connector 50E. The housing 70G has a projecting portion 74G different from the projecting portion 74E of the housing 70E. The projecting portion 74G is formed with the second key 744A. The second connector 50G has a structure similar to that of the second connector 50E except for the second key 744A which is provided instead of the second key 744.

Figure 39:
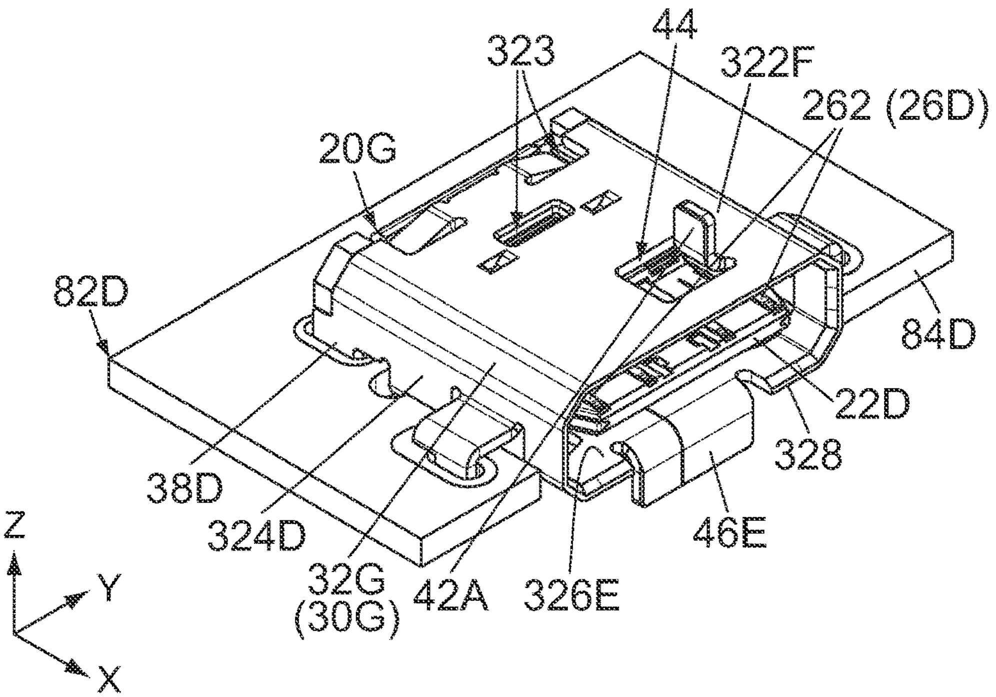
FIG. 39 is a perspective view showing the first connector of the connector assembly of FIG. 38.

Comparing FIG. 39 with FIG. 32, the first connector 20G comprises a first shell 30G different from the first shell 30E of the first connector 20E. The first shell 30G has the first key 42A and has a first mateable portion 32G which is different from the first mateable portion 32E of the first shell 30E. The first key 42A is a projection provided on the first mateable portion 32G and is located outward of the first mateable portion 32G in the YZ-plane. The first connector 20G has a structure similar to the first connector 20E except for the first key 42A which is provided instead of the first key 42.

Figure 40:
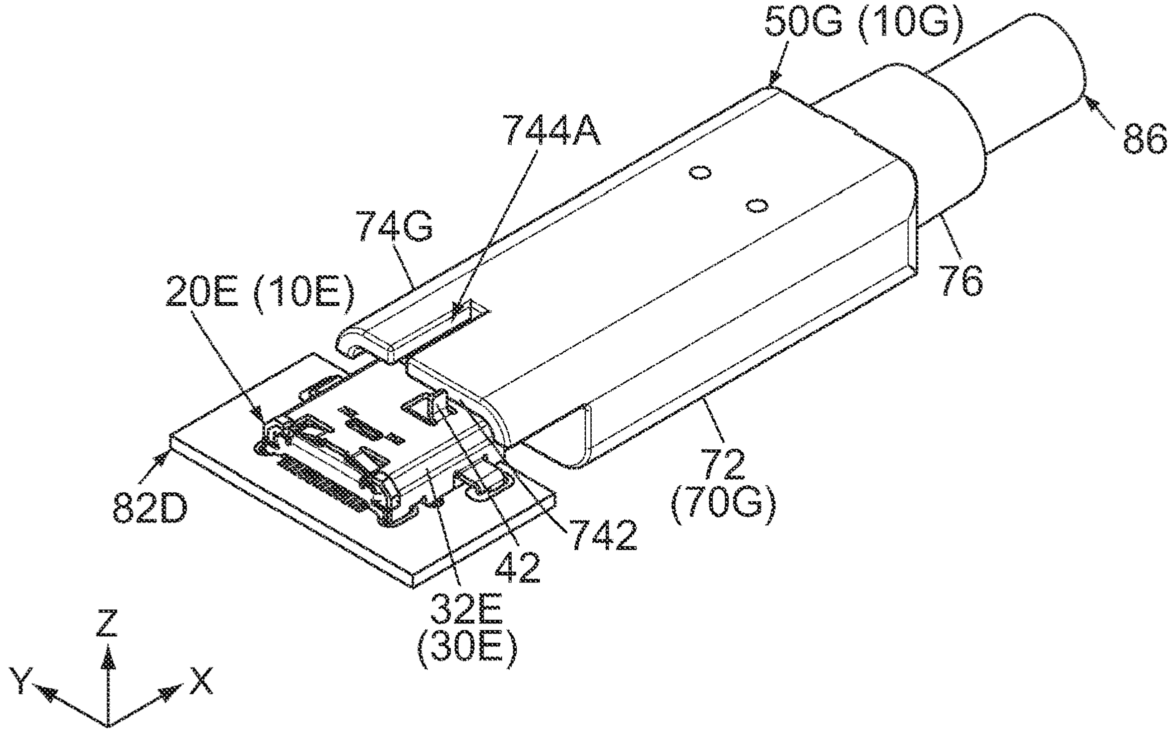
FIG. 40 is a perspective view showing the first connector of the connector assembly of FIG. 30 and the second connector of the connector assembly of FIG. 38, wherein an end of a second mateable portion of the second connector is received in a first mateable portion of the first connector.
Figure 41:
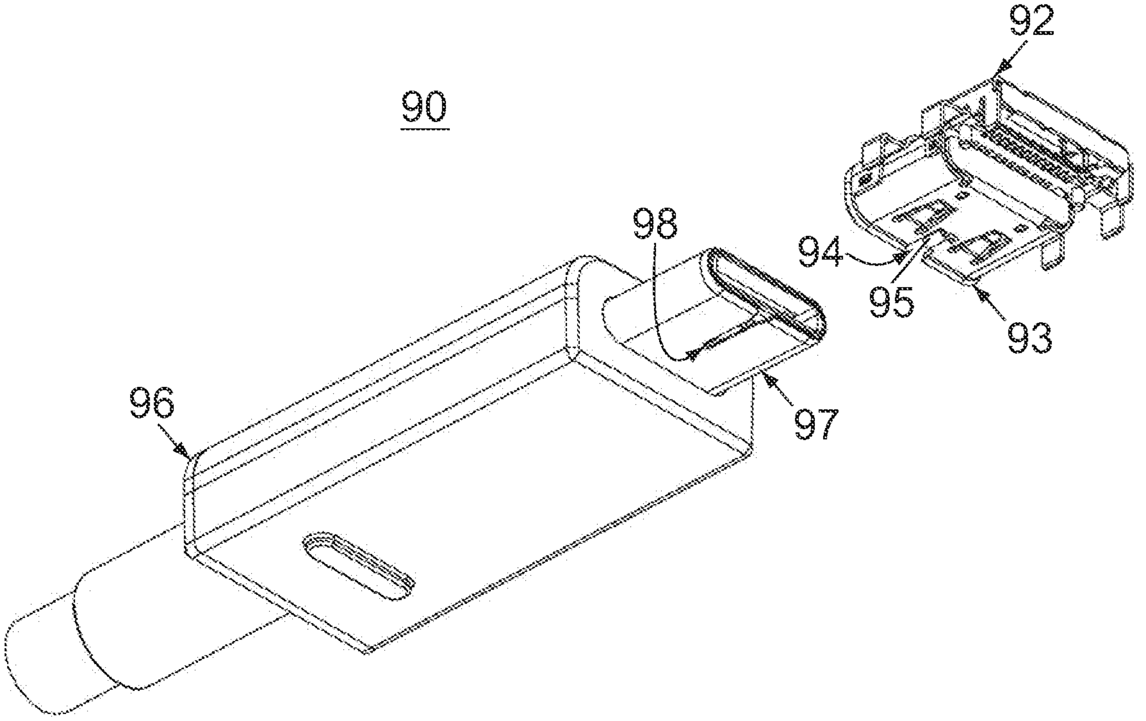
FIG.41 PRIOR ART
FIG. 41 is a perspective view showing a connector assembly of Patent Document 1.

Referring to FIG. 38, when the second connector 50G is moved toward the first connector 20G along the X-direction under the separated state, the first key 42A is received in the second key 744A, and the second connector 50G is mated with the first connector 20G. In contrast, referring to FIG. 40, when the second connector 50G of the connector assembly 10G is moved toward the first connector 20E of the connector assembly 10E under the separated state, the projecting end 742 is brought into abutment with the first key 42. The mechanism described above prevents the first connector 20E and the second connector 50G from being mated with each other.

Referring to FIG. 38, as described above, the connector assembly 10G of the present modification has mating keys which allow only the proper second connector 50G to be mated with the first connector 20G. The mating keys of the present modification include the first key 42A of the first connector 20G and the second key 744A of the second connector 50G. The present modification provides the connector assembly 10G which comprises the mating keys and is configured to prevent EMI.

The embodiment and modifications described above can be further variously modified and can be combined variously.

What is claimed is:

1. A connector assembly comprising a first connector and a second connector, wherein:

the first connector and the second connector are mateable with each other along a mating direction;

the first connector comprises a first holding member, two or more first terminals and a first shell;

the first terminals are held by the first holding member;

each of the first terminals has a first contact portion;

the first shell has a first mateable portion and a first key;

the first mateable portion encloses, at least in part, the first contact portions in a perpendicular plane perpendicular to the mating direction;

the first key is a projection provided on the first mateable portion and is located outward of the first mateable portion in the perpendicular plane;

the second connector comprises a second holding member, two or more second terminals, a second shell and a housing;

the second terminals are held by the second holding member;

each of the second terminals has a second contact portion;

the second shell has a second mateable portion;

the second mateable portion encloses all around the second contact portions in the perpendicular plane;

the housing has a projecting portion, a projecting end and a second key;

the projecting portion is apart from the second mateable portion in the perpendicular plane and encloses, at least in part, the second mateable portion in the perpendicular plane;

the projecting end faces the first connector in the mating direction when the first connector and the second connector are under a separated state where they are separated from each other in the mating direction;

the second key is a groove formed in the housing and extends from the projecting end along the mating direction;

the first contact portions are brought into contact with the second contact portions, respectively, under a mated state where the first connector and the second connector are mated with each other;

under the mated state, the second mateable portion is received in the first mateable portion, and the first key is received in the second key;

the housing has a far end;

the far end faces the first connector in the mating direction when the first connector and the second connector are under the separated state;

the projecting end is located between the first connector and the far end in the mating direction when the first connector and the second connector are under the separated state;

the first connecter has a stopper;

the stopper is located outward of the first mateable portion in the perpendicular plane;

when the first shell is seen along the mating direction, the stopper and the first key are apart from each other; and the far end of the second connector is in contact with or faces the stopper in the mating direction under the mated state.

2. The connector assembly as recited in claim 1, wherein when the first shell is seen along the mating direction, the stopper and the first key are located at opposite sides of the first mateable portion, respectively.

3. The connector assembly as recited in claim 1, wherein:

a width of the first key when the first shell is seen along the mating direction is smaller than a width of the second key when the second shell is seen along the mating direction; and the width of the second key when the second shell is seen along the mating direction is smaller than a width of the stopper when the first shell is seen along the mating direction.

4. The connector assembly as recited in claim 1, wherein the second mateable portion extends beyond the projecting end of the housing in the mating direction.

5. The connector assembly as recited in claim 1, wherein the second mateable portion has a 180-degree rotationally symmetrical shape in the perpendicular plane.

6. A connector assembly comprising a first connector and a second connector, wherein:

the first connector and the second connector are mateable with each other along a mating direction;

the first connector comprises a first holding member, two or more first terminals and a first shell;

the first terminals are held by the first holding member;

each of the first terminals has a first contact portion;

the first shell has a first mateable portion and a first key;

the first mateable portion encloses, at least in part, the first contact portions in a perpendicular plane perpendicular to the mating direction;

the first key is a projection provided on the first mateable portion and is located outward of the first mateable portion in the perpendicular plane;

the second connector comprises a second holding member, two or more second terminals, a second shell and a housing;

the second terminals are held by the second holding member;

each of the second terminals has a second contact portion;

the second shell has a second mateable portion;

the second mateable portion encloses all around the second contact portions in the perpendicular plane;

the housing has a projecting portion, a projecting end and a second key;

the projecting portion is apart from the second mateable portion in the perpendicular plane and encloses, at least in part, the second mateable portion in the perpendicular plane;

the projecting end faces the first connector in the mating direction when the first connector and the second connector are under a separated state where they are separated from each other in the mating direction;

the second key is a groove formed in the housing and extends from the projecting end along the mating direction;

the first contact portions are brought into contact with the second contact portions, respectively, under a mated state where the first connector and the second connector are mated with each other;

under the mated state, the second mateable portion is received in the first mateable portion, and the first key is received in the second key;

the housing has a far end;

the far end faces the first connector in the mating direction when the first connector and the second connector are under the separated state;

the projecting end is located between the first connector and the far end in the mating direction when the first connector and the second connector are under the separated state;

the first connector is configured to be mounted on a board which extends in parallel to the mating direction and has an edge in the mating direction;

when the first connector is mounted on the board, the first key is apart from the board in the perpendicular plane; and the far end of the second connector is in contact with or faces the edge in the mating direction under the mated state.

7. The connector assembly as recited in claim 6, wherein the second mateable portion extends beyond the projecting end of the housing in the mating direction.

8. The connector assembly as recited in claim 6, wherein the second mateable portion has a 180-degree rotationally symmetrical shape in the perpendicular plane.

* * * * *